United States Patent
Wahadaniah et al.

(10) Patent No.: US 12,501,067 B2
(45) Date of Patent: *Dec. 16, 2025

(54) VIDEO ENCODING METHOD AND VIDEO DECODING METHOD

(71) Applicant: Sun Patent Trust, New York, NY (US)

(72) Inventors: Viktor Wahadaniah, Singapore (SG); Chong Soon Lim, Singapore (SG); Sue Mon Thet Naing, San Jose, CA (US); Takahiro Nishi, Nara (JP); Youji Shibahara, Osaka (JP); Hisao Sasai, Osaka (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/376,921

(22) Filed: Oct. 5, 2023

(65) Prior Publication Data

US 2024/0031599 A1 Jan. 25, 2024

Related U.S. Application Data

(63) Continuation of application No. 17/686,688, filed on Mar. 4, 2022, now Pat. No. 11,818,391, which is a (Continued)

(51) Int. Cl.
H04N 19/573 (2014.01)
H04N 19/159 (2014.01)
(Continued)

(52) U.S. Cl.
CPC ......... *H04N 19/573* (2014.11); *H04N 19/159* (2014.11); *H04N 19/31* (2014.11);
(Continued)

(58) Field of Classification Search
CPC .... H04N 19/573; H04N 19/159; H04N 19/31; H04N 19/593; H04N 19/65; H04N 19/70
See application file for complete search history.

(56) References Cited

U.S. PATENT DOCUMENTS 8,090,017 B2   1/2012 Ying et al.
2007/0110150 A1   5/2007 Wang et al.
(Continued)

FOREIGN PATENT DOCUMENTS

EP   1 809 042   7/2007
WO   2007/042916   4/2007
(Continued)

OTHER PUBLICATIONS

International Search Report issued May 15, 2012 in International (PCT) Application No. PCT/JP2012/001013 .
(Continued)

*Primary Examiner* — Jonathan R Messmore
(74) *Attorney, Agent, or Firm* — Wenderoth, Lind & Ponack, L.L.P.

(57) ABSTRACT

A video encoding method using a plurality of reference pictures includes: selecting whether or not a resilient picture referencing scheme is to be used for encoding video; writing a parameter indicating the selection into a header of an encoded video bitstream; and encoding a picture using inter-picture prediction using a result of the selection.

2 Claims, 44 Drawing Sheets

Related U.S. Application Data continuation of application No. 17/139,039, filed on Dec. 31, 2020, now Pat. No. 11,303,926, which is a continuation of application No. 16/507,457, filed on Jul. 10, 2019, now Pat. No. 10,917,659, which is a continuation of application No. 15/836,187, filed on Dec. 8, 2017, now Pat. No. 10,397,605, which is a continuation of application No. 15/399,966, filed on Jan. 6, 2017, now Pat. No. 9,961,362, which is a continuation of application No. 13/957,478, filed on Aug. 2, 2013, now Pat. No. 9,602,818, which is a continuation of application No. PCT/JP2012/001013, filed on Feb. 16, 2012.

(60) Provisional application No. 61/443,373, filed on Feb. 16, 2011.

(51) Int. Cl.
   H04N 19/31    (2014.01)
   H04N 19/593   (2014.01)
   H04N 19/65    (2014.01)
   H04N 19/70    (2014.01)
   *H04N 19/172*     (2014.01)
   *H04N 19/184*     (2014.01)
   *H04N 19/61*      (2014.01)

(52) U.S. Cl.
   CPC ........... *H04N 19/593* (2014.11); *H04N 19/65* (2014.11); *H04N 19/70* (2014.11); *H04N 19/172* (2014.11); *H04N 19/184* (2014.11); *H04N 19/61* (2014.11)

(56) References Cited

U.S. PATENT DOCUMENTS

| | | | |
|---|---|---|---|
| 2007/0230566 A1 | 10/2007 | Eleftheriadis et al. | |
| 2008/0130658 A1 | 6/2008 | Chakareski et al. | |
| 2009/0067496 A1 | 3/2009 | Ying et al. | |
| 2012/0027316 A1 | 2/2012 | Wang et al. | |
| 2012/0163470 A1* | 6/2012 | Wu .................. | H04N 19/176 375/240.23 |
| 2012/0230594 A1* | 9/2012 | Boyce ................ | H04N 19/44 382/232 |
| 2013/0315315 A1* | 11/2013 | Wahadaniah ........ | H04N 19/31 375/240.16 |
| 2018/0103267 A1* | 4/2018 | Wahadaniah ........ | H04N 19/70 |

FOREIGN PATENT DOCUMENTS

| | | |
|---|---|---|
| WO | 2008/047303 | 4/2008 |
| WO | 2008/048886 | 4/2008 |
| WO | 2009/130561 | 10/2009 |

OTHER PUBLICATIONS

ITU-T H. 264 Mar. 2010.

Jill Boyce et al. High layer syntax to improve support for temporal scalability, Joint Collaborative Team on Video Coding (JCT-VC) of ITU-T SG16 WP3 and ISO/IEC JTC1/SC29/WG11, JCTVC-D200, 4th meeting: Daegu, KR, Jan. 2011, pp. 1-14.

Heiko Schwarz et al., Hierarchical B Pictures, Joint Video Team (JVT) of ISO/IEC MPEG & ITU VCEG (ISO/JTC1/SC29/WG11 and ITU-T SG16 Q.6), JVT-P014, 16th meeting: Poznan, PL, Jul. 23-29, 2005, pp. 1-31.

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.

Extended European Search Report mailed Oct. 1, 2014 in corresponding European Application No. 12747108.4.

Ye-Kui Wang et al., "On reference picture list construction", Joint Collaborative Team on Video Coding (JCT-VC) of ITU-T SG16 WP3 and ISO/IEC JTC1/SC29/WG11, JCTVC-D081, 4th Meeting: Daegu, KR, Jan. 20-28, 2011.

Boyce et al., High Layer syntax to improve support for temporal scalability, JCT-VC, Jan. 2011, p. 1-14.

* cited by examiner

FIG. 2
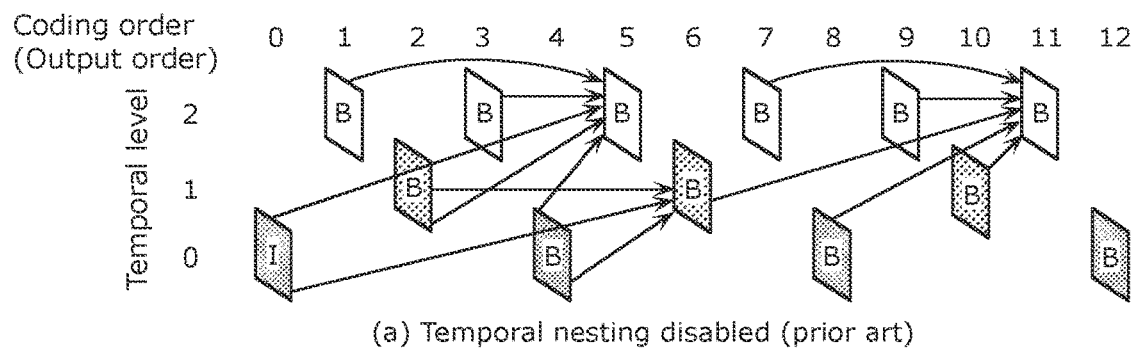
(a) Temporal nesting disabled (prior art)
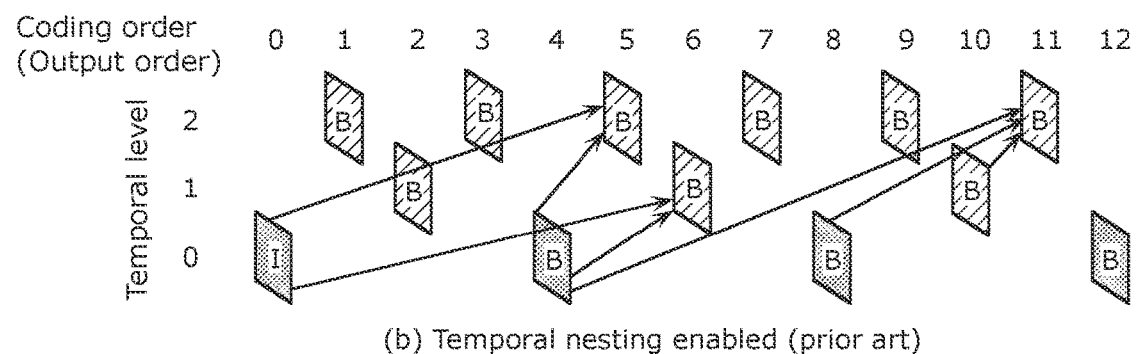
(b) Temporal nesting enabled (prior art)
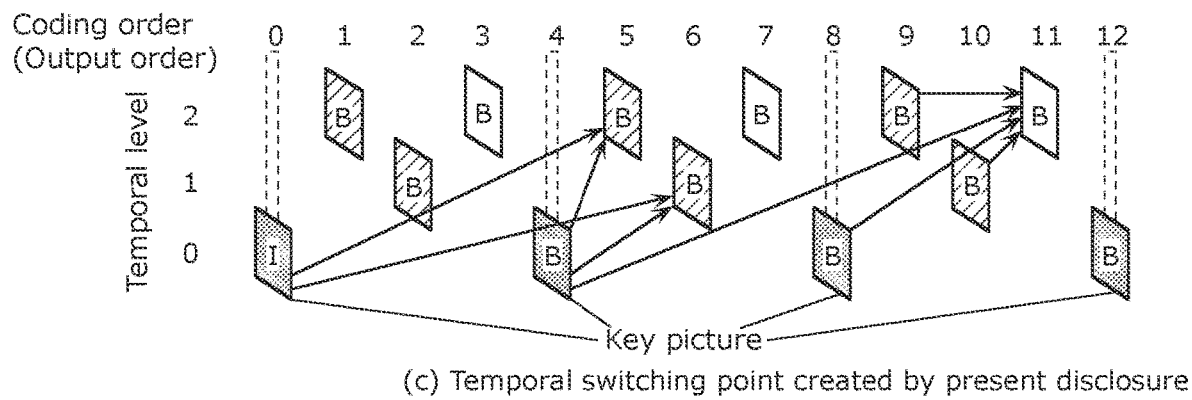
(c) Temporal switching point created by present disclosure

FIG. 38

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 49
| Corresponding standard | Driving frequency |
|---|---|
| MPEG-4 AVC | 500 MHz |
| MPEG-2 | 350 MHz |
| ⋮ | ⋮ |
FIG. 50A
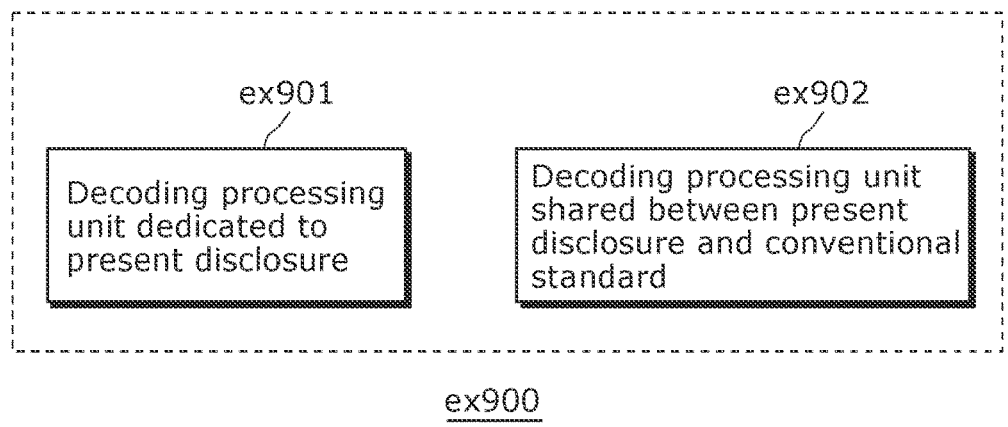
FIG. 50B
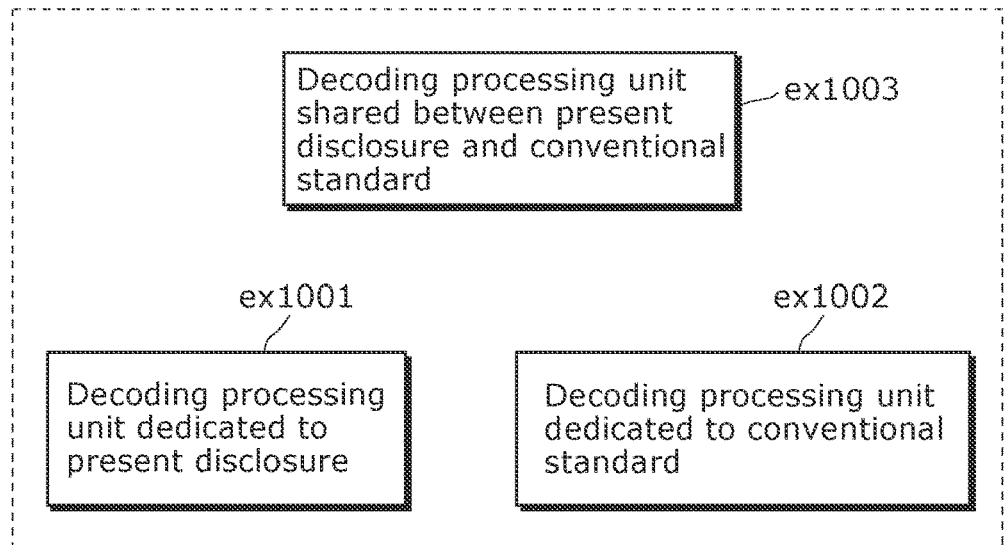

VIDEO ENCODING METHOD AND VIDEO DECODING METHOD

FIELD

One or more exemplary embodiments disclosed herein relate generally to multimedia data coding, and relates in particular to a video encoding method and a video decoding method which utilize more than one reference picture for inter-picture prediction.

BACKGROUND

A latest video encoding method, such as MPEG-4 AVC/H.264 (non patent literature (NPL) 1) and a future generation high-efficiency video coding (HEVC), supports the inter-picture prediction utilizing motion compensated prediction from more than one reference picture.

Recent advancements, such as ongoing development of an HEVC video coding standard, may utilize a hierarchical coding structure in design, experiment, and evaluation activities. Advantages of the hierarchical coding structure include improved coding efficiency and improved picture quality. In the hierarchical coding structure, pictures are arranged in temporal levels where the lowest level represents a lowest frame rate and inclusion of subsequent high levels (the temporal level is 1 or 2) represents higher frame rates.

The temporal levels are also used for enabling a feature of temporal scalability of a coded video bitstream. Switching from a higher temporal level (higher frame rate) to a lower temporal level (lower frame rate) is enabled by restricting picture referencing so that a current picture only refers to reference pictures at the same or lower temporal levels. On the other hand, switching from the lower temporal level to the higher temporal level is enabled by using a temporal nesting scheme. However, when a picture having a lower temporal level is decoded in a coding order, reference pictures having higher temporal levels can no longer be used for prediction.

CITATION LIST

Non Patent Literature

[NPL 1] ITU-T H.264 03/2010

SUMMARY

Technical Problem

Switching from lower to higher temporal level can be performed at any time by using a temporal nesting scheme according to a conventional technique. However, such a scheme introduces some loss in coding efficiency due to its highly restrictive referencing structure.

Solution to Problem

One non-limiting and exemplary embodiment of the present disclosure provides a new method for a resilient picture referencing scheme. The new method allows for more efficient inter-picture prediction with improved error resilience, and provides switching points from lower to higher frame rates in a temporally scalable coded video bitstream.

What is novel about the present disclosure is that a boundary picture is defined for limiting picture referencing in the inter-picture prediction, thereby allowing recovery in a decoding process when mismatch occurs between an encoding process and the decoding process. Furthermore, a predetermined scheme for reference picture list construction using the present disclosure allows a hierarchical coding structure to be performed which efficiently minimizes a bit of a signal for performing reordering in the reference list. Lastly, the coded video bitstreams generated using the present disclosure inherently contains temporal scalability switching points.

In one general aspect, the techniques disclosed here feature a video encoding method for encoding a current picture in a video using one or more reference pictures, the video encoding method comprising: selecting whether or not a temporally scalable scheme is to be used for encoding the video; determining a classification of a picture in the video using a result of the selection regarding the temporally scalable scheme; judging whether the picture is a key picture or not, the key picture having a predetermined temporal level; selecting, when the classification of the current picture is determined as a predetermined classification indicating a picture usable as a switching point of temporal levels, one or more valid reference pictures, each of which is the key picture, out of all reference pictures in a reference picture memory, for the current picture; constructing a reference picture list including at least one of the one or more valid reference pictures; and encoding the current picture into a bitstream by performing motion prediction on the current picture using the one or more valid reference pictures in the reference picture list.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A video encoding method and a video decoding method according to one or more exemplary embodiments or features disclosed herein provide a means for recovery of an error and for an optimal selection of a reference picture in encoding and decoding video using a plurality of reference pictures. Accordingly, the effect of the present disclosure is in the form of improvement in error resilience and coding efficiency.

BRIEF DESCRIPTION OF DRAWINGS

FIG. 2 is a diagram which shows an example of switching points from lower to higher temporal levels in a coded video bitstream which supports temporal scalability.

FIG. 38 is a diagram which shows a structure of multiplexed data.

FIG. 49 is a diagram which shows an example of a look-up table in which video data standards are associated with driving frequencies.

FIG. 50A is a diagram which shows an example of a configuration for sharing a module of a signal processing unit.

FIG. 50B is a diagram which shows another example of a configuration for sharing a module of the signal processing unit.

These and other advantages and features will become apparent from the following description thereof taken in conjunction with the accompanying Drawings, by way of non-limiting examples of embodiments disclosed herein.

DESCRIPTION OF EMBODIMENT(S)

[(Underlying Knowledge Forming Basis of the Present Disclosure)]

In relation to the conventional video coding method disclosed in the Background section, the inventors have found the following problem.

A latest video coding scheme, such as MPEG-4 AVC/H. 264 (NPL 1) and a future generation high-efficiency video coding (HEVC), supports inter-picture prediction utilizing motion compensated prediction from more than one reference picture. In the case where there are more than one reference pictures, one or more reference picture lists are created for the inter-picture prediction, and the reference pictures that are temporally closer to a current picture are sorted to the top of the lists by a predetermined scheme. From the top to the bottom of the reference picture list, reference pictures are uniquely identified by a reference index having an incremental value.

Figure 1:
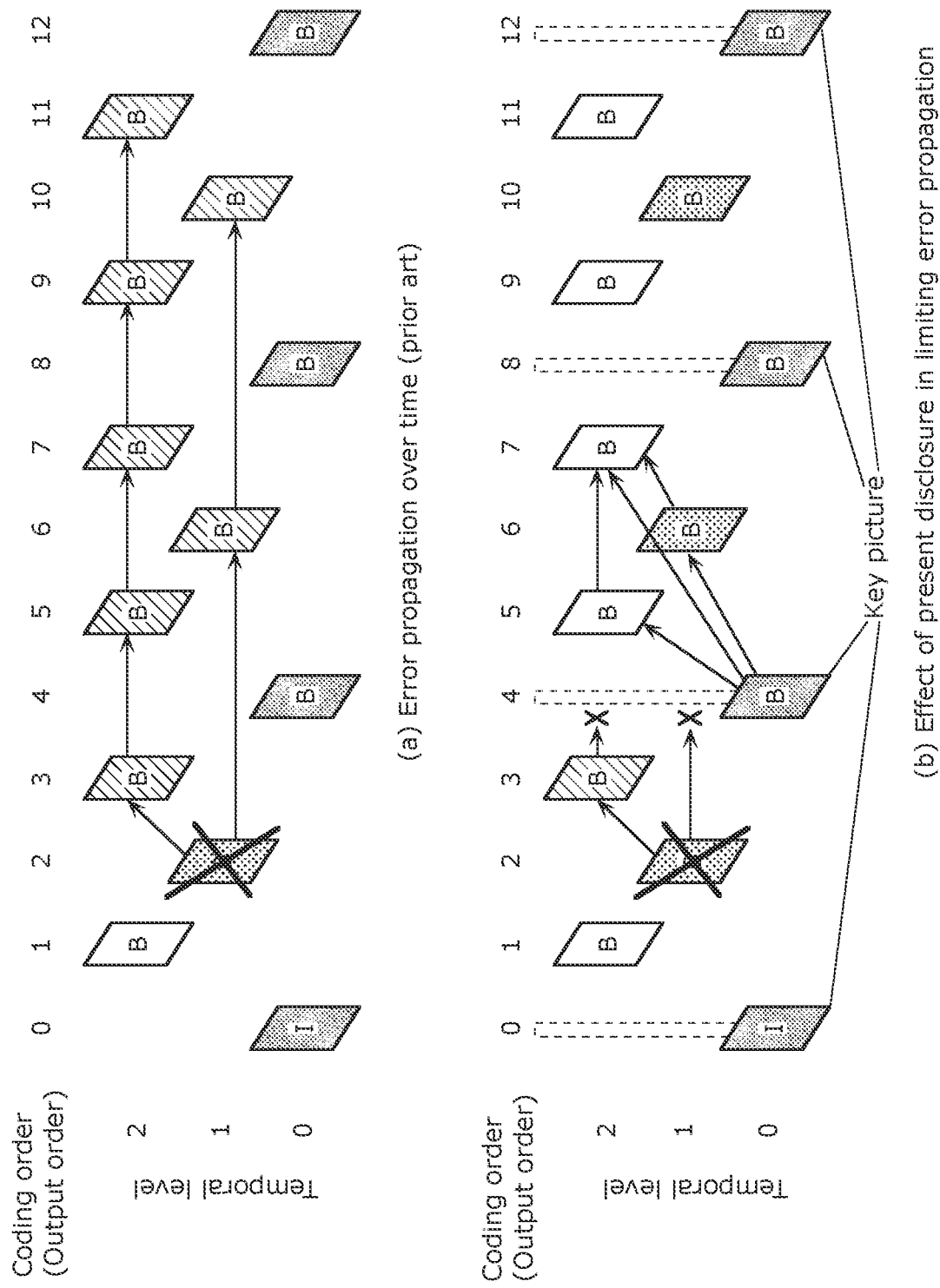
FIG. 1 is a diagram which shows an example of error propagation when mismatch occurs between an encoding process and a decoding process, and effect according to the present disclosure which restricts the error propagation.

Recent advancements, such as ongoing development of an HEVC video coding standard, utilize hierarchical coding structure in design, experiment, and evaluation activities. Advantages of the hierarchical coding structure include improved coding efficiency and improved picture quality. In the hierarchical coding structure, pictures are arranged in temporal levels where the lowest level represents a lowest frame rate and inclusion of subsequent high levels (temporal level 1 or 2) represents higher frame rates. Examples of the hierarchical coding structure are shown in FIG. 1 and FIG. 2. A certain amount of coding gain can be obtained by coding pictures at lower temporal levels with better quality (for example by applying less quantization) than pictures at higher temporal levels. In the HEVC, the temporal level is indicated by means of a syntax parameter temporal_id located in a header of a network abstraction layer (NAL) unit of a coded slice of a picture.

The temporal level is also used for enabling the feature of temporal scalability of a coded video bitstream. Switching from a higher temporal level (higher frame rate) to a lower temporal level (lower frame rate) is enabled by restricting picture referencing so that a current picture only refers to reference pictures at the same or lower temporal levels. On the other hand, switching from the lower temporal level to the higher temporal level is enabled by using a temporal nesting scheme. However, when a picture having the lower temporal level is decoded in a coding order, reference pictures having higher temporal levels can no longer be used for prediction.

When mismatch between an encoding process and a decoding process exist, such as in the case of erroneous lossy transmission, the inter-picture prediction may propagate the error across a large number of pictures, as illustrated in (a) of FIG. 1. In the (a) of FIG. 1, the error occurs in a picture B2 (the number 2 denotes the order of output). The picture B2 is used as a reference picture for an inter-picture prediction process in a picture B3 and a picture B6, so that the error propagates to the picture B3 and picture B6. Subsequent use of the picture B3 and the picture B6 as reference pictures further propagates this error. Such error propagation is a major problem for a certain application such as low delay video transmission over a public network.

Typically, different quality level is set for each picture corresponding to the temporal level as described above, to thereby improve subjective and objective result totally. The problem with the prior art is such that a reference picture which is temporally far-off and has low quality is usually less useful than a reference picture which is temporally far-off and has high quality. Therefore, the reference picture which is temporally far-off and has low quality is included in the reference picture list, resulting in sub-optimal coding efficiency, as a reference index corresponding to the reference picture which is temporally far-off and has high quality may require more signaling bits.

Using the temporal nesting scheme according to a conventional technique, switching from a lower temporal level to a higher temporal level can be performed at any time. However, such a scheme introduces some loss in coding efficiency due to its highly restrictive referencing structure. In view of the above, a video encoding method and a video decoding method according to one or more exemplary embodiments or features disclosed herein provide a new method for a resistant picture referencing scheme. The new method allows for more efficient inter-picture prediction with improved error resilience, and provides switching points from a lower frame rate to a higher frame rate in a temporally scalable coded video bitstream.

Hereinafter, certain exemplary embodiments are described in detail with reference to the accompanying drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended claims and their equivalents. The present disclosure is specified by the scope of the claims. Therefore, among the structural elements in the following exemplary embodiments, structural elements not recited in any one of the independent claims are described as arbitrary structural elements which are not indispensable for achieving the present disclosure but form more desirable embodiment.

According to an exemplary embodiment disclosed herein, a video encoding method for encoding a current picture in a video using one or more reference pictures, the video encoding method may include: selecting whether or not a temporally scalable scheme is to be used for encoding the video; determining a classification of a picture in the video using a result of the selection regarding the temporally scalable scheme; judging whether the picture is a key picture or not, the key picture having a predetermined temporal level; selecting, when the classification of the current picture is determined as a predetermined classification indicating a picture usable as a switching point of temporal levels, one or more valid reference pictures, each of which is the key picture, out of all reference pictures in a reference picture memory, for the current picture; constructing a reference picture list including at least one of the one or more valid reference pictures; and encoding the current picture into a bitstream by performing motion prediction on the current picture using the one or more valid reference pictures in the reference picture list.

For example, the video encoding method may further include writing classification information indicating the classification of the current picture into a header of the bitstream.

For example, in the writing, a temporal level parameter indicating a temporal level of the current picture may be further written into the header of the bitstream.

For example, in the judging, it may be judged whether or not a temporal level parameter of the picture is zero; in the selecting of the one or more valid reference picture, when the classification of the current picture having the temporal level parameter greater than zero is determined as the predetermined classification, one or more of the key pictures may be selected.

For example, in the writing, selection information and reference information may be further written into the header of the bitstream, the selection information indicating the result of the selection regarding the temporally scalable scheme, and the reference information indicating the reference pictures in the reference picture memory.

For example, the key picture may be an inter-predicted picture.

For example, in the selecting of the one or more valid reference pictures, when the classification of the current picture is not determined as the predetermined classification, a non-key picture may be selected as one of the one or more valid reference picture.

For example, in the selecting of the one or more valid pictures, when the classification of the current picture is not determined as the predetermined classification, the all reference pictures in the reference picture memory may be selected as the one or more valid reference pictures, the constructing may further include: constructing a first reference picture list including one or more reference pictures in the reference picture memory, using a temporal distance between each of the one or more reference pictures and the current picture; constructing a second reference picture list including the one or more valid reference pictures, using the temporal distance between the each of the one or more reference pictures and the current picture and the classification of the each of the one or more reference pictures; reordering the first reference picture list to make the first reference picture list be equivalent to the second reference picture list; and in the encoding, the current picture is predicted, using the reordered first reference picture list.

For example, the video encoding method may further include: selecting a first reference picture group including one or more key pictures out of the reference picture memory; identifying, when the classification of the current picture is not determined as the predetermined classification, (i) a first boundary picture as a key picture having a nearest temporal instance to the current picture among key pictures displayed earlier than the current picture, and (ii) a second boundary picture as a key picture having a nearest temporal instance to the current picture among key pictures displayed later than the current picture; performing, when the second boundary picture is not present, (i) selection of a second reference picture group including a non-key-reference picture displayed later than the first boundary picture, and (ii) addition of the second reference picture group to the first reference picture group; performing, when the second boundary picture is present, (i) selection of a third reference picture group including a non-key-reference picture displayed later than the first boundary picture and earlier than the second boundary picture, and (ii) addition of the third reference picture group to the first reference picture group; and placing the first reference picture group on the reference picture list which is sorted according to a predetermined scheme, using the temporal distance to the current picture and the classification.

A video encoding apparatus which encodes a current picture in a video using one or more reference pictures, the video encoding apparatus may include: a selection unit configured to select whether or not a temporally scalable scheme is to be used for encoding the video; a classification determination unit configured to determine a classification of a picture in the video using a result regarding the selection of the temporally scalable scheme; a judgment unit configured to judge whether the picture is a key picture or not, the key picture having a predetermined temporal level; a valid reference picture selection unit configured to select one or more valid reference pictures, each of which is the key picture, out of all reference pictures in a reference picture memory for the current picture, when the classification of the current picture is determined as a predetermined classification indicating a picture usable as a switching point of temporal levels; a reference picture list construction unit configured to construct a reference picture list including at least one of the one or more valid reference pictures; and an encoding unit configured to encode the current picture into a bitstream by performing motion prediction on the current picture using the one or more valid reference pictures in the reference picture list.

A video decoding method for decoding a bitstream corresponding to a current picture in a video using one or more reference pictures, the video decoding method may include: determining whether or not a temporally scalable scheme is to be used for decoding the video; obtaining a classification of a picture in the video, the classification being determined by using a result of the determination regarding the temporally scalable scheme; judging whether the picture is a key picture or not, the key picture having a predetermined temporal level; selecting, when the classification of the current picture is a predetermined classification indicating a picture usable as a switching point of temporal levels, one or more valid reference pictures, each of which is the key picture, out of all reference pictures in a reference picture memory, for the current picture; constructing a reference picture list including at least one of the one or more valid reference pictures; and decoding the current picture by performing motion prediction on the current picture using the one or more valid reference pictures in the reference picture list.

For example, the video decoding method may further include obtaining classification information indicating the classification of the current picture, from a header of the bitstream.

For example, the video decoding method may further include obtaining a temporal level parameter indicating a temporal level of the current picture, from the header of the bitstream.

For example, in the judging, it may be judged whether or not a temporal level parameter of the picture is zero; in the selecting of the one or more valid reference picture, when the classification of the current picture having the temporal level parameter greater than zero is the predetermined classification, one or more of the key pictures may be selected.

For example, the video decoding method may further include obtaining selection information and reference information from a header of the bitstream, the selection information indicating whether or not the temporally scalable scheme is to be used for decoding the video, and the reference information indicating the reference pictures in the reference picture memory.

For example, the key picture may be an inter-predicted picture.

For example, in the selecting of the one or more valid reference pictures, when the classification of the current picture is not the predetermined classification, a non-key picture may be selected as one of the one or more valid reference picture.

For example, in the selecting of the one or more valid reference pictures, when the classification of the current picture is not the predetermined classification, the all reference pictures in the reference picture memory may be selected as the one or more valid reference pictures, the constructing may further include: constructing a first reference picture list including one or more reference pictures in the reference picture memory, using a temporal distance between each of the one or more reference pictures and the current picture; constructing a second reference picture list including the one or more valid reference picture, using the temporal distance between the each of the one or more reference pictures and the current picture and the classification of the each of the one or more reference pictures; reordering the first reference picture list to make the first reference picture list be equivalent to the second reference picture list; and in the decoding, the current picture is predicted, using the reordered first reference picture list.

For example, the video decoding method may further include: selecting a first reference picture group including one or more key pictures out of the reference picture memory; identifying, when the classification of the current picture is not the predetermined classification, (i) a first boundary picture as a key picture having a nearest temporal instance to the current picture among key pictures displayed earlier than the current picture, and (ii) a second boundary picture as a key picture having a nearest temporal instance to the current picture among key pictures displayed later than the current picture; performing, when the second boundary picture is not present, (i) selection of a second reference picture group including a non-key-reference picture displayed later than the first boundary picture, and (ii) addition of the second reference picture group to the first reference picture group; performing, when the second boundary picture is present, (i) selection of a third reference picture group including a non-key-reference picture displayed later than the first boundary picture and earlier than the second boundary picture, and (ii) addition of the third reference picture group to the first reference picture group; and placing the first reference picture group on the reference picture list which is sorted according to a predetermined scheme, using a temporal distance to the current picture and the classification.

A video decoding apparatus which decodes a bitstream corresponding to a current picture in a video using one or more reference pictures, the video decoding apparatus may include: a determination unit configured to determine whether or not a temporally scalable scheme is to be used for decoding the video; an obtainment unit configured to obtain a classification of a picture in the video, the classification being determined by using a result of the determination regarding the temporally scalable scheme; a judgment unit configured to judge whether the picture is a key picture or not, the key picture having a predetermined temporal level; a valid reference picture selection unit configured to select one or more valid reference pictures, each of which is the key picture, out of all reference pictures in a reference picture memory for the current picture, when the classification of the current picture is a predetermined classification indicating a picture usable as a switching point of temporal levels; a reference picture list construction unit configured to construct a reference picture list including at least one of the one or more valid reference pictures; and a decoding unit configured to decode the current picture by performing motion prediction on the current picture using the one or more valid reference pictures in the reference picture list.

For consistency of descriptions, this specification uses a convention where primary pictures at the lowest frame rate with a lowest value of the temporal level (for example, the value 0) and subsequent higher values of the temporal level (for example, the values 1, 2 and 3) indicate subsequent sets of pictures producing higher (double) frame rates when added on a top of the lower temporal levels. The same convention is used in recent video coding schemes such as HEVC, H.264 MVC extension and H.264 SVC extension, in which the temporal level is indicated using the syntax parameter temporal_id. It will be apparent to those skilled in the art that an alternative convention where a greater value of the temporal level indicates a lower frame rate serves the same purpose.

FIG. 1 shows an example of error propagation when mismatch occurs between the encoding process and the decoding process such as due to the transmission loss. In the prior art as shown in (a) of FIG. 1, the error may propagate across a large number of pictures, often appearing as persistent visual artifacts in a reconstructed picture. In the (a) of FIG. 1, pictures affected by the error are indicated using hatched shading. As shown in (b) of FIG. 1, in the present disclosure, key pictures are defined and picture referencing is restricted to share borders with the nearest key pictures, so that the inter-picture prediction from non-key pictures located temporally beyond the nearest key pictures is not allowed. For simplicity, FIG. 1 shows a low delay coding example where only forward prediction exists. However, the restriction of picture referencing to share borders with the nearest key pictures shall be applied in both forward and backward prediction directions. Using the present disclosure, the error propagation is stopped at a key picture (picture B4) and subsequent pictures (pictures B5, B6, B7 and so on) can be perfectly reconstructed with no error.

FIG. 2 shows an example illustrating effects of the present disclosure in creating the switching point from lower to higher temporal levels in the temporally scalable video bitstream. In the prior art, when the temporal nesting is disabled as shown in (a) of FIG. 2, switching from lower to higher temporal levels is not supported. For example, switching to the highest frame rate (corresponding to a temporal level 2) cannot be performed at the picture B5 because the picture B1 and the picture B3 are necessary for the decoding of the picture B5.

When the temporal nesting is enabled in the prior art as shown in (b) of FIG. 2, switching from lower to higher temporal levels can be performed at any point (as indicated in pictures by hatched shading). For example, switching to the temporal level 2 can be performed at the picture B5 because the picture B5 is predicted from only a picture 10 and a picture B4. However, when the temporal nesting is enabled, the picture referencing becomes highly restrictive and tends to introduce loss in coding efficiency. On the other hand, in practical application of the temporal scalable coding, the switching point may not be necessarily provided at every picture.

As described above, according to the present disclosure, the picture referencing is restricted to share borders with the key pictures. As a result, the first picture of each of the temporal levels, which follows the key picture can be used as the switching point. For example, a picture B2 is a valid switching point to a temporal level 1, and the picture B1 is a valid switching point to the temporal level 2. Subsequent pictures at an arbitrary temporal level (such as the picture B3 at the temporal level 2) cannot be used as the switching point. However, the picture referencing for each of these subsequent pictures is less restrictive (for example, a picture B11 is allowed to use a picture B9 as prediction reference), so that more efficient coding is allowed. Therefore, the present disclosure provides some practical balance between temporal scalability property and coding efficiency.

Figure 3:
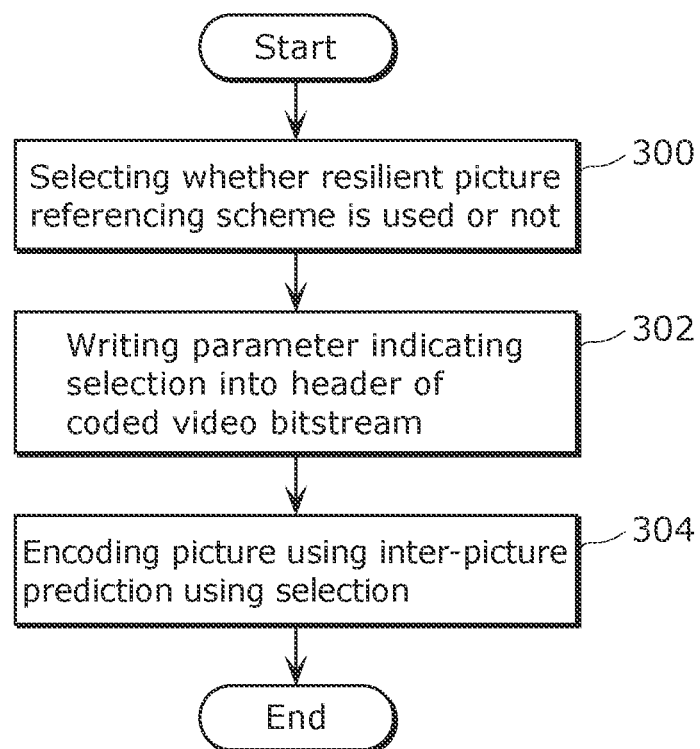
FIG. 3 is a flowchart which shows a video encoding process using the present disclosure.

FIG. 3 is a flowchart which shows the video encoding process using the present disclosure. It should be noted that a module described in the specification of the present application is a software module or a hardware module. A module 300 selects whether a resilient picture referencing scheme is used or not. A module 302 then writes a parameter into a header of a coded video bitstream indicating the selection. Next, a module 304 performs encoding on a picture using the inter-picture prediction using the result of the selection. When the resilient picture referencing scheme is used, a reference picture selection process and an ordering process are performed in a manner that the picture referencing is restricted to share the boundary with the key pictures, as described above. In this specification, the following shall describe, in detail, embodiments of the resilient picture referencing scheme.

Figure 4:
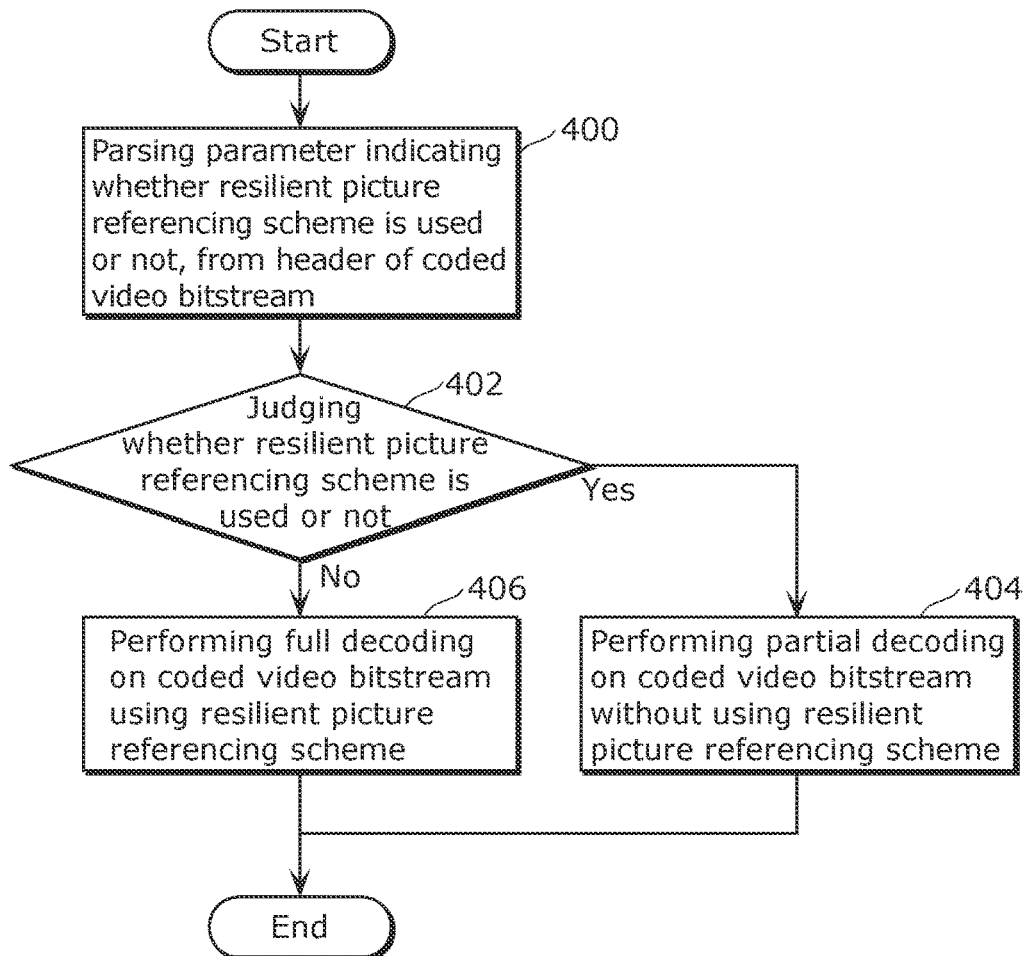
FIG. 4 is a flowchart which shows a video decoding process using the present disclosure.

FIG. 4 is a flowchart which shows a video decoding process using the present disclosure. A module 400 parses a parameter indicating whether the resilient picture referencing scheme is used or not, from the header of the coded video bitstream. Next, a module 402 judges whether the resilient picture referencing scheme is used or not.

When the resilient picture referencing scheme is used, a module 404 performs partial decoding on the coded video bitstream using the resilient picture referencing scheme. In the partial decoding, the resilient picture referencing scheme is used in the same way as the encoding process. In the partial decoding, the decoding process on some coded pictures is omitted without influencing the decoding process on other coded pictures.

When the resilient picture referencing scheme is not used, a module 406 performs a full decoding on a coded video bitstream without using the resilient picture referencing scheme.

Figure 5:
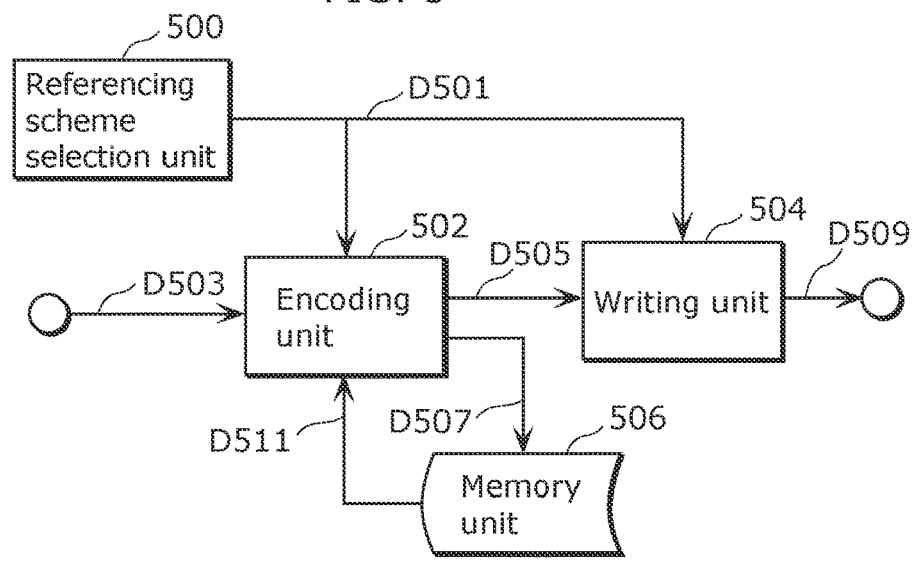
FIG. 5 is a block diagram which shows an example of a video encoding apparatus using the present disclosure.

FIG. 5 is a block diagram which shows an example of a video encoding apparatus using the present disclosure. The video encoding apparatus includes a referencing scheme selection unit 500, an encoding unit 502, a writing unit 504, and a memory unit 506.

As shown in FIG. 5, the referencing scheme selection unit 500 selects whether the resilient picture referencing scheme is used or not. The encoding unit 502 uses a scheme selection D501 which is a selection result by the referencing scheme selection unit 500 and a reference picture D511 stored in the memory unit 506, to encode an uncompressed original image D503 using the inter-picture prediction. As a result, coded picture data D505 and reference picture data D507 are obtained. The writing unit 504 then takes the coded picture data D505 and the scheme selection D501 to produce a coded video bitstream D509. The reference picture data D507 which includes a reconstructed sample of the original image D503 is stored into the memory unit 506. In one possible implementation of the present disclosure using the first embodiment of the resilient picture referencing scheme, the reference picture data D507 further includes a picture marking signal for marking the reference picture stored in the memory unit 506 as used for reference or as unused for reference.

Figure 6:
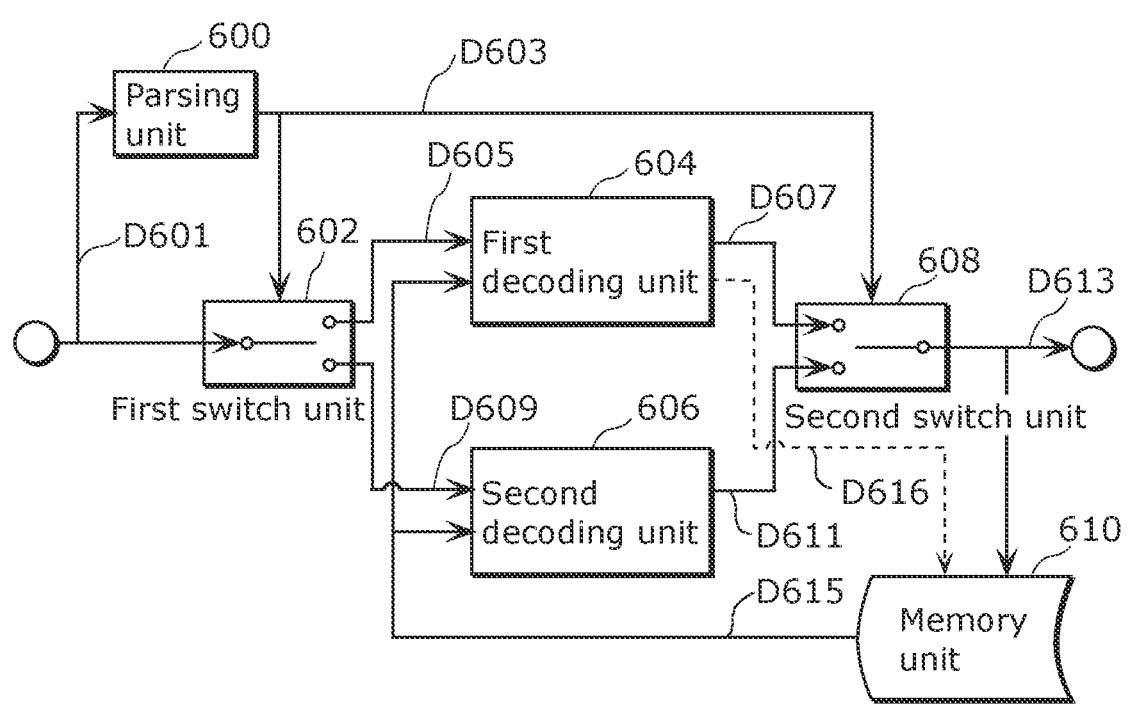
FIG. 6 is a block diagram which shows an example of a video decoding apparatus using the present disclosure.

FIG. 6 is a block diagram illustrating an example of a video decoding apparatus using the present disclosure. The video decoding apparatus includes a parsing unit 600, a first switch unit 602, a first decoding unit 604, a second decoding unit 606, a second switch unit 608, and a memory unit 610.

As shown in FIG. 6, the parsing unit 600 parses a header of a coded video bitstream D601 to obtain a parameter D603 indicating a selection whether the resilient picture referencing scheme is used or not. Based on the parsed parameter D603, the switch unit 602 sends the coded video bitstream D601 either to the first decoding unit D604 or to the second decoding unit D606.

When a reference picture D615 stored in the memory unit 610 is used, the first decoding unit D604 performs partial decoding on the coded video bitstream D605 using the resilient picture referencing scheme. In the partial decoding, the decoding processes of some coded pictures are omitted without influencing the decoding process of other coded pictures. In one possible implementation of the present disclosure using the first embodiment of the resilient picture referencing scheme, the first decoding unit D604 sends a picture marking signal D616 for marking reference pictures stored in the memory unit 610 as used for reference or as unused for reference.

On the other hand, using the reference picture D615 stored in the memory unit 610, the second decoding unit D606 performs full decoding of a coded video bitstream D609 without using the resilient picture referencing scheme. Based on the parsed parameter D603, the second switch unit 608 switches a reconstructed picture to be sent, as the output D613 of the decoding process, between a reconstructed picture D607 from the first decoding unit D604 and a reconstructed picture D611 from the second decoding unit 606. The reconstructed picture serving as the output D613 of the decoding process is also stored into the memory unit 610 to be used in an inter-picture predicted decoding process of subsequent coded pictures.

Figure 7:
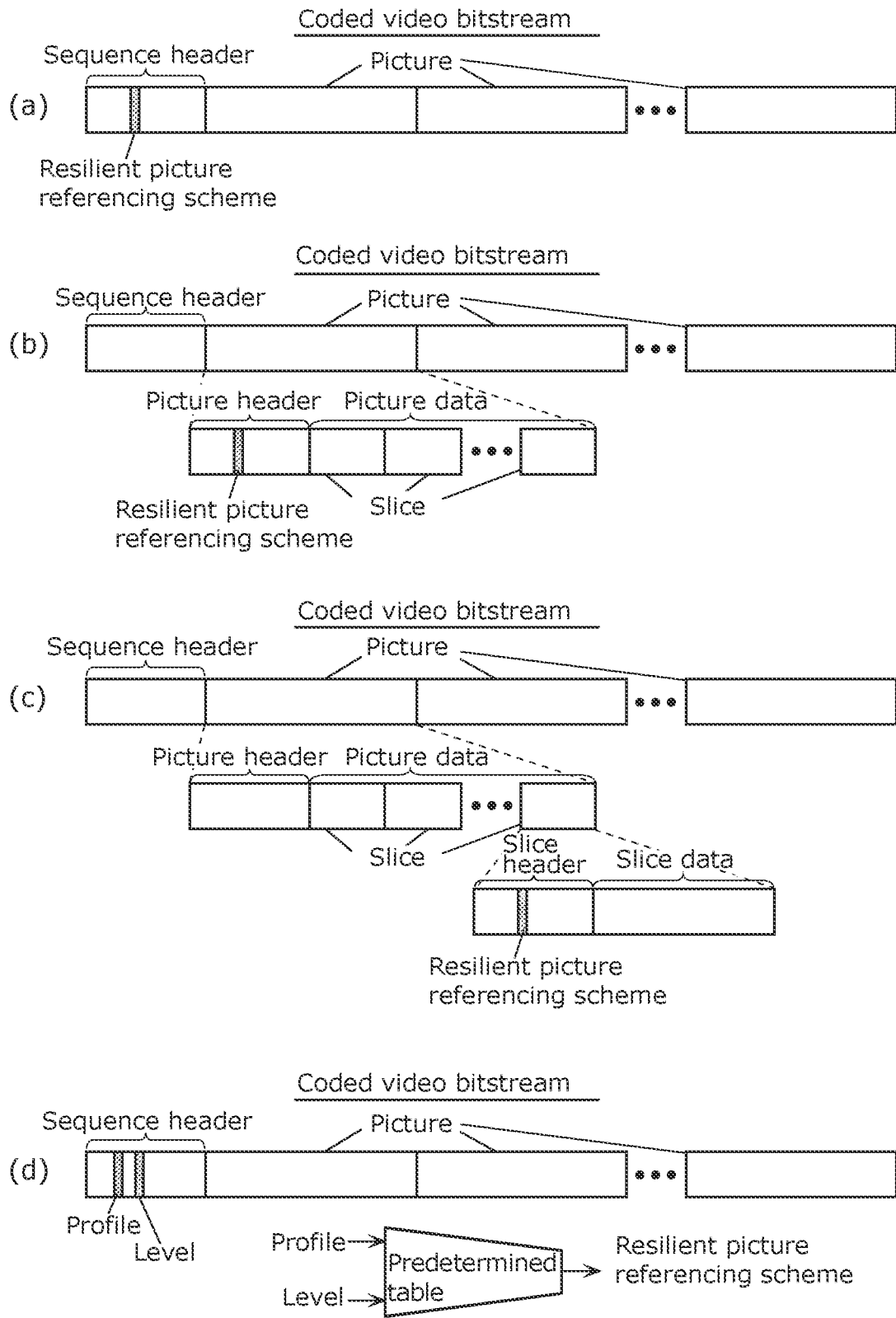
FIG. 7 is a diagram which shows a location of a parameter indicating whether or not a resilient picture referencing scheme is used, in a header of a coded video bitstream.

FIG. 7 is a diagram which shows a location of a parameter indicating whether the resilient picture referencing scheme is used or not, in a header of a coded video bitstream. Examples of the parameter include a flag with a value 1 indicating that the resilient picture referencing scheme is used and a value 0 indicating that the resilient picture referencing scheme is not used. A drawing (a) of FIG. 7 shows a location of the parameter in a sequence header of a compressed video bitstream. A drawing (b) of FIG. 7 shows a location of the parameter in a picture header of the compressed video bitstream. A drawing (c) of FIG. 7 shows a location of the parameter in a slice header of the compressed video bitstream. A drawing (d) of FIG. 7 shows that the parameter can also be derived from a predetermined look-up table based on a profile parameter, a level parameter, or both profile and level parameters which are located in a sequence header of the compressed video bitstream.

Figure 8:
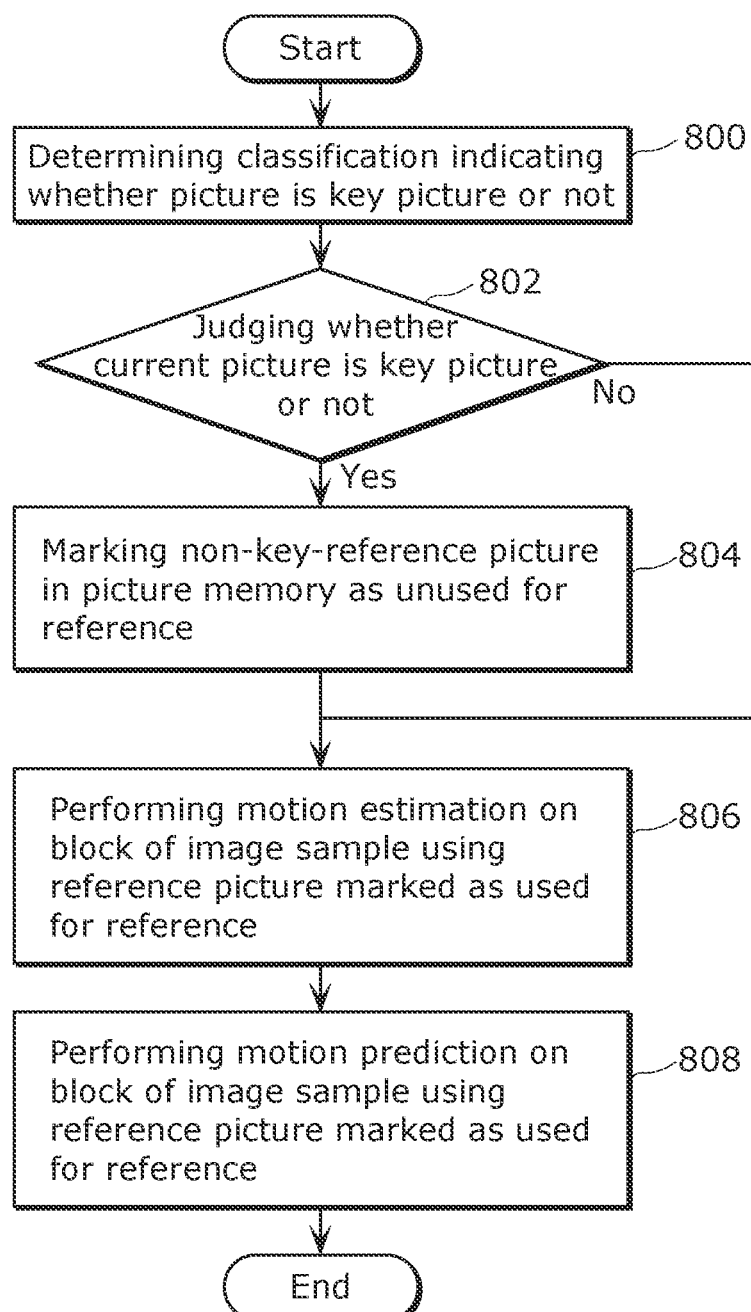
FIG. 8 is a flowchart which shows a video encoding process using a first embodiment of a resilient picture referencing scheme according to the present disclosure.

FIG. 8 is a flowchart showing a video encoding process using the first embodiment of the resilient picture referencing scheme according to the present disclosure. A module 800 determines a classification indicating whether a picture is a key picture or not. The following shall describe, in detail, embodiments of the classification indicating whether a picture is a key picture or not. A module 802 judges whether a current picture is a key picture or not. When the current picture is the key picture, a module 804 marks a non-key reference picture stored in a picture memory as unused for reference.

Next, regardless of whether the current picture is the key picture or not, a motion estimation process is performed on a block of an image sample using the reference picture marked as used for reference in the module 804, and a motion prediction process is performed on the block of the image sample using the reference picture marked as used for reference in a module 808.

Figure 9:
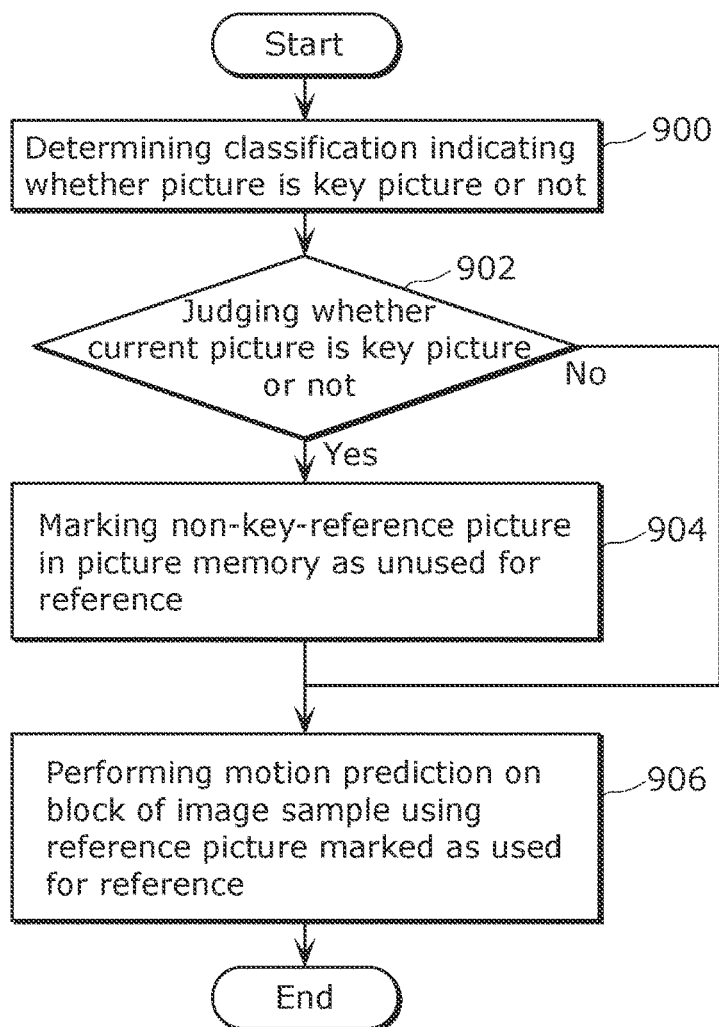
FIG. 9 is a flowchart which shows the video encoding process using the first embodiment of the resilient picture referencing scheme according to the present disclosure.

FIG. 9 is a flowchart which shows a video decoding process using the first embodiment of the resilient picture referencing scheme according to the present disclosure. A module 900 determines a classification indicating whether a picture is the key picture or not. Then, a module 902 judges whether the current picture is the key picture or not. When the current picture is the key picture, a module 904 marks the non-key reference picture stored in the picture memory, as unused for reference.

Next, regardless of whether the current picture is the key picture or not, the motion prediction process is performed on the block of the image sample using the reference picture (other than the reference picture marked as unused for reference) marked as used for reference in the module 906.

Figure 10:
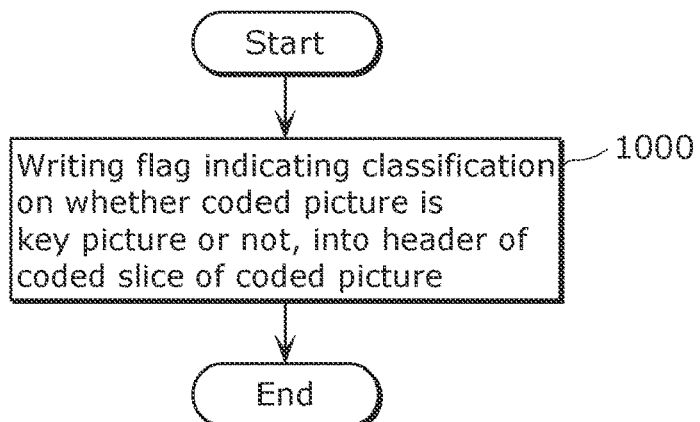
FIG. 10 is a flowchart which shows a first embodiment of a process for determining a classification indicating whether a picture is a key picture or not in the video encoding process using the resilient picture referencing scheme according to the present disclosure.

FIG. 10 is a flowchart which shows the first embodiment of the process for determining a classification indicating whether a picture is a key picture or not in the video encoding process using the resilient picture referencing scheme according to the present disclosure. In a module 1000, a flag indicating a classification on whether the coded picture is the key picture or not is written into a header of a coded slice of a coded picture.

Figure 11:
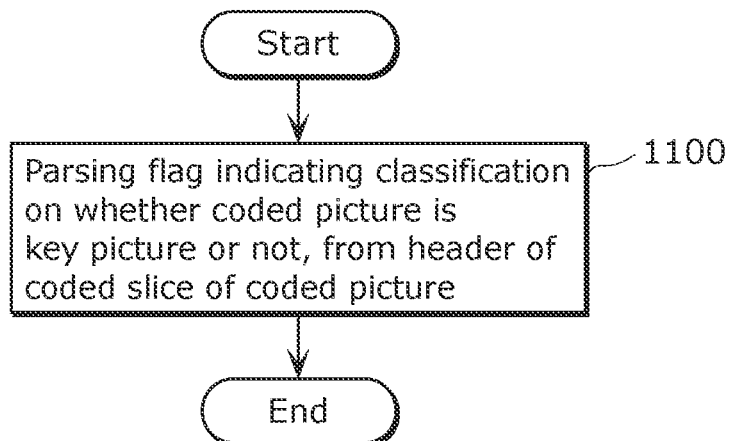
FIG. 11 is a flowchart which shows a first embodiment of a process for determining a classification indicating whether a picture is a key picture or not in the video decoding process using the resilient picture referencing scheme according to the present disclosure.

FIG. 11 is a flowchart which shows the first embodiment of the process for determining a classification indicating whether a picture is a key picture or not in a video decoding process using the resilient picture referencing scheme according to the present disclosure. In a module 1100, a flag indicating the classification on whether the coded picture is the key picture or not is parsed from a header of a coded slice of a coded picture.

Figure 12:
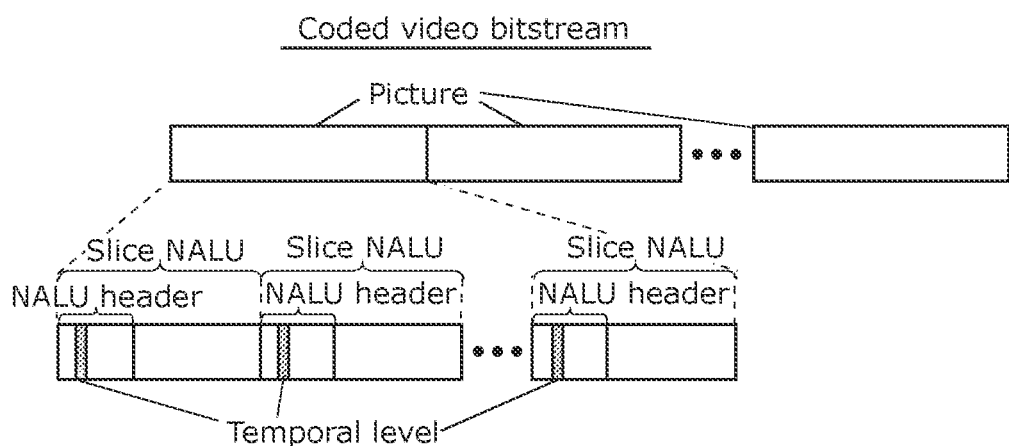
FIG. 12 is a diagram which shows a location of a flag indicating a classification on whether a coded picture is the key picture or not in a header of a coded slice of the coded picture, according to the first embodiment of the process for determining the classification indicating whether a picture is the key picture or not in the video encoding process and the video decoding process using the resilient picture referencing scheme according to the present disclosure.

FIG. 12 is a diagram which shows a location of a flag indicating a classification on whether a coded picture is the key picture or not, in a header of a coded slice of a coded picture, according to the first embodiment of the process for determining the classification indicating whether a picture is the key picture or not in the video encoding process and the video decoding process using the resilient picture referencing scheme according to the present disclosure. In a coded video bitstream, a coded picture is represented in one or more slice network abstraction layer units (NALU). The flag indicating the classification of pictures is located in the NALU header of the slice NALU.

Figure 13:
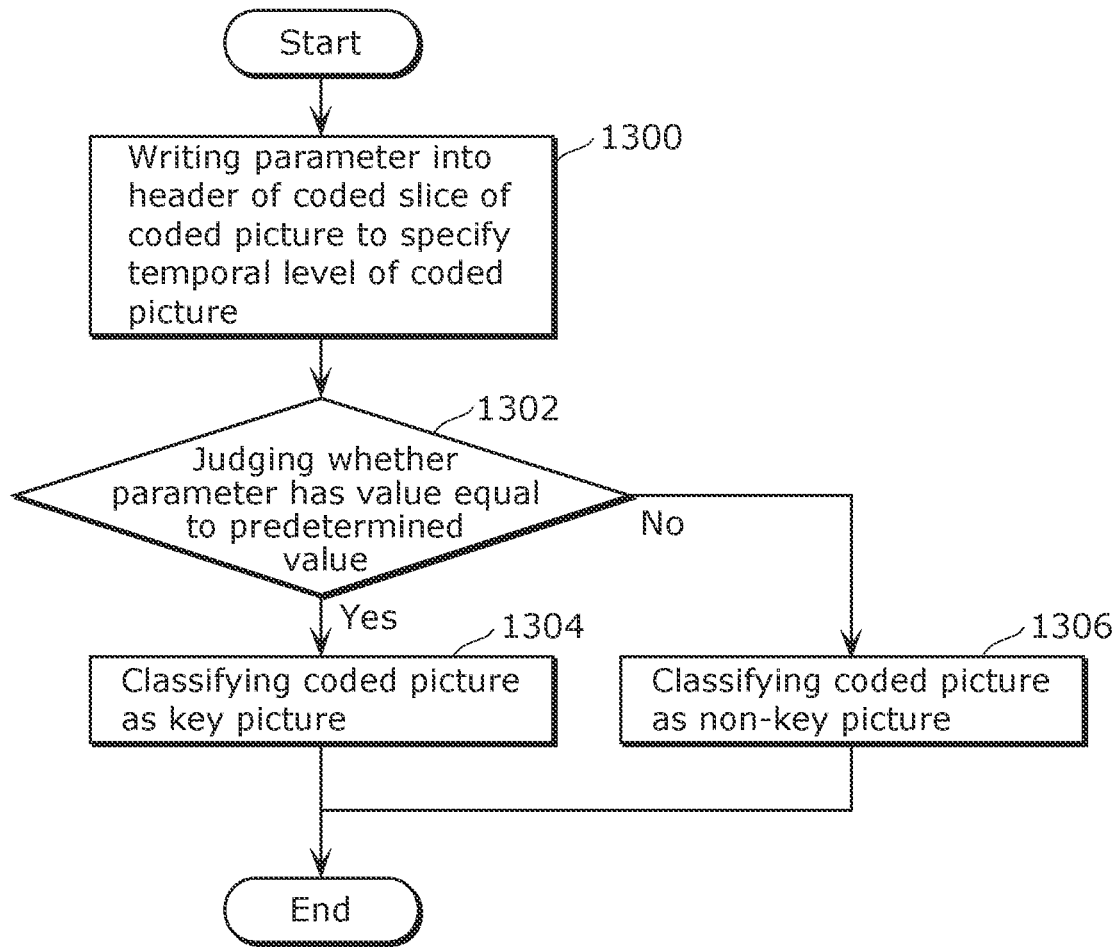
FIG. 13 is a flowchart which shows a second embodiment of the process for determining the classification indicating whether a picture is the key picture or not in the video encoding process using the resilient picture referencing scheme according to the present disclosure.

FIG. 13 is a flowchart which shows a second embodiment of the process for determining the classification indicating whether a picture is the key picture or not in the video encoding process using the resilient picture referencing scheme according to the present disclosure. First, a module 1300 writes a parameter into a header of a coded slice of a coded picture to specify a temporal level of the coded picture. Examples of the parameter to specify the temporal level include the syntax parameter temporal_id in the HEVC video coding scheme. Then, a module 1302 judges whether the parameter has a value equal to a predetermined value. Examples of the predetermined value include the value 0 indicating the lowest temporal level corresponding to the lowest frame rate representation. When the parameter value is equal to the predetermined value, a module 1304 classifies the coded picture as the key picture. When the parameter value is not equal to the predetermined value, a module 1306 classifies the coded picture as a non-key picture.

Figure 14:
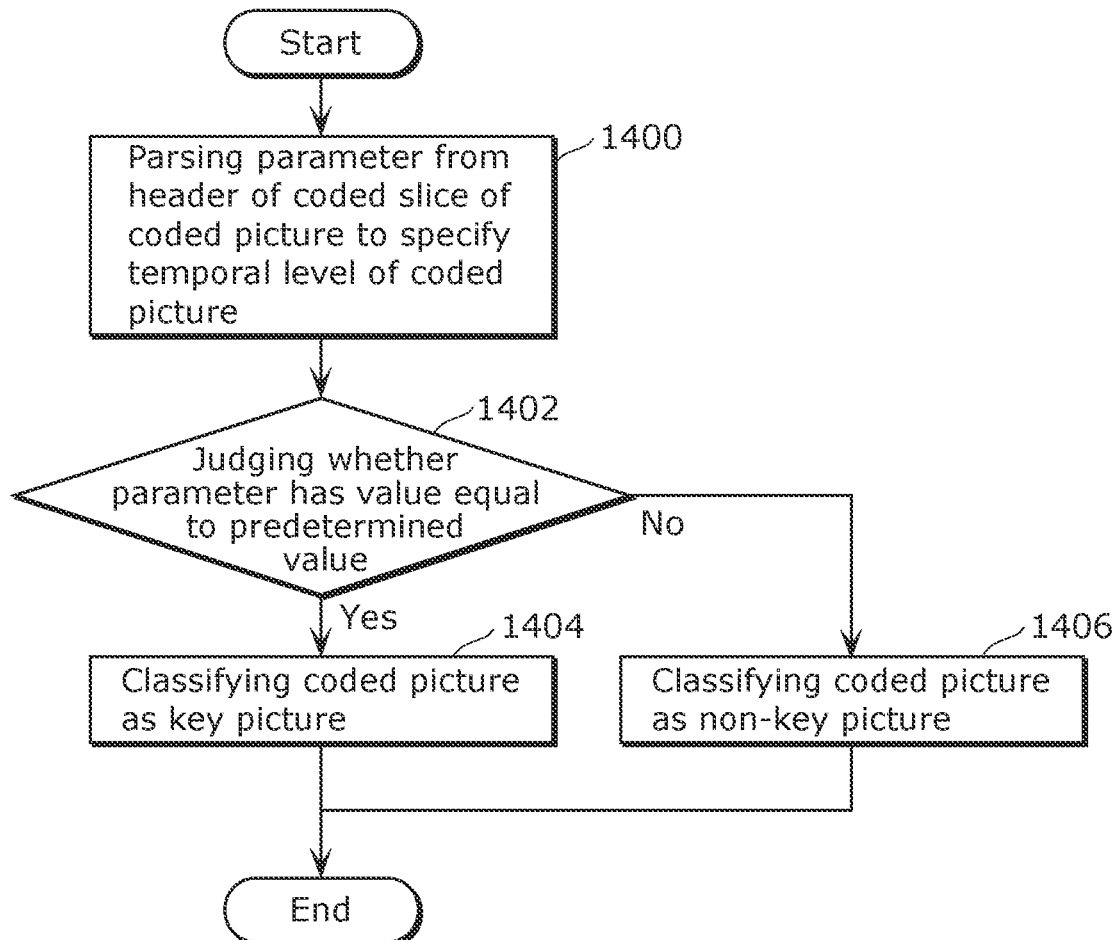
FIG. 14 is a flowchart which shows a second embodiment of the process for determining the classification indicating whether a picture is the key picture or not in the video decoding process using the resilient picture referencing scheme according to the present disclosure.

FIG. 14 is a flowchart which shows the second embodiment of the process for determining the classification indicating whether a picture is the key picture or not in the video decoding process using the resilient picture referencing scheme according to the present disclosure. First, a module 1400 parses a parameter from a header of a coded slice of a coded picture to specify the temporal level of the coded picture. Then, a module 1402 judges whether the parameter has a value equal to a predetermined value. When the parameter value is equal to the predetermined value, a module 1404 classifies the coded picture as the key picture. When the parameter value is not equal to the predetermined value, a module 1406 classifies the coded picture as the non-key picture.

Figure 15:
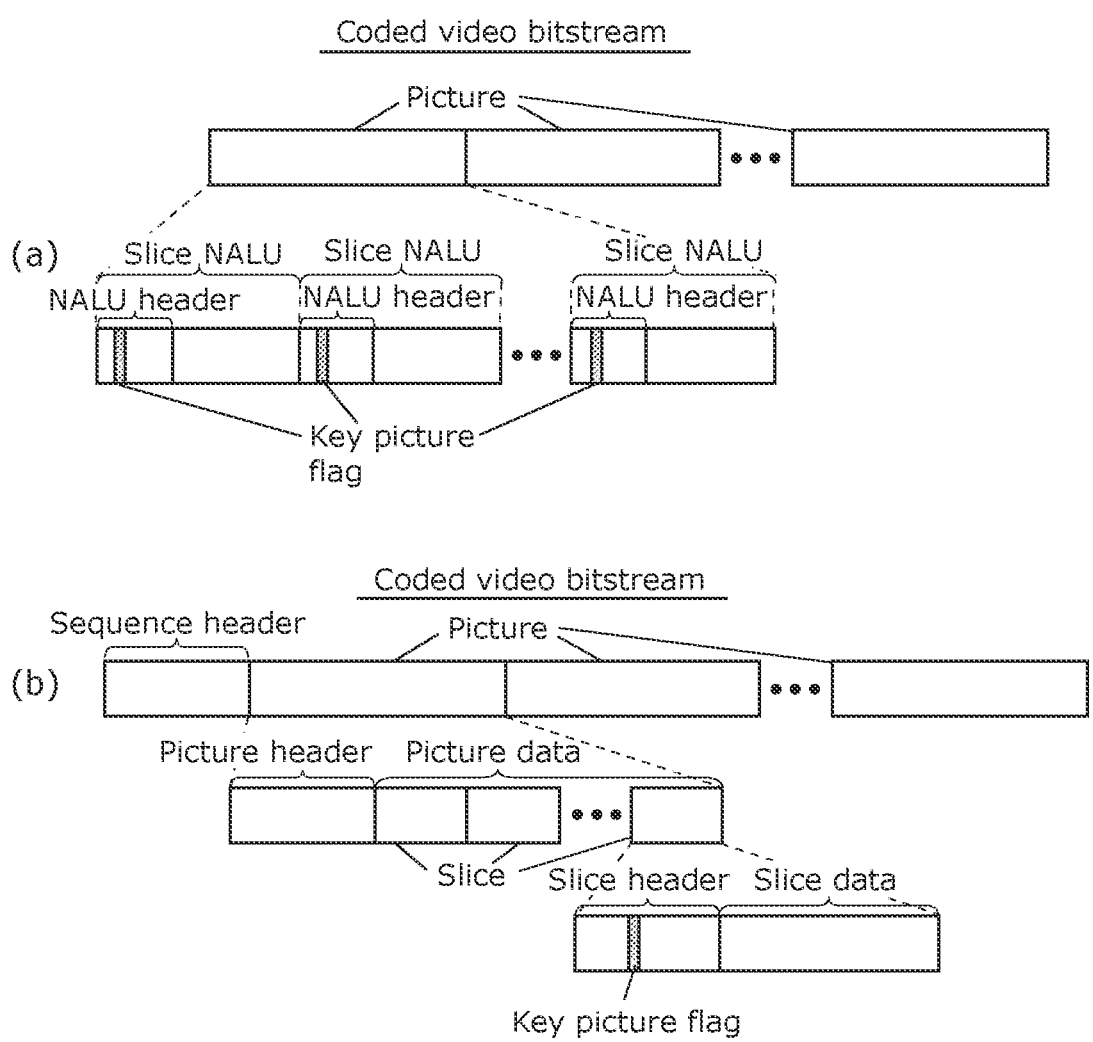
FIG. 15 is a diagram which shows a location of a parameter to specify a temporal level of a coded picture in a header of a coded slice of the coded picture, according to the second embodiment of the process for determining the classification indicating whether a picture is the key picture or not in the video encoding process and the video decoding process using the resilient picture referencing scheme according to the present disclosure.

FIG. 15 is a diagram which shows a location of the parameter to specify the temporal level of the coded picture in a header of a coded slice of a coded picture, according to the second embodiment of the process for determining the classification indicating whether a picture is the key picture or not in the video encoding process and the video decoding process using the resilient picture referencing scheme according to the present disclosure. A drawing (a) of FIG. 15 shows a location of the parameter representing a coded picture in a NALU header of a slice NALU. A drawing (b) of FIG. 15 shows the location of the parameter in a slice header of a compressed video bitstream.

Figure 16:
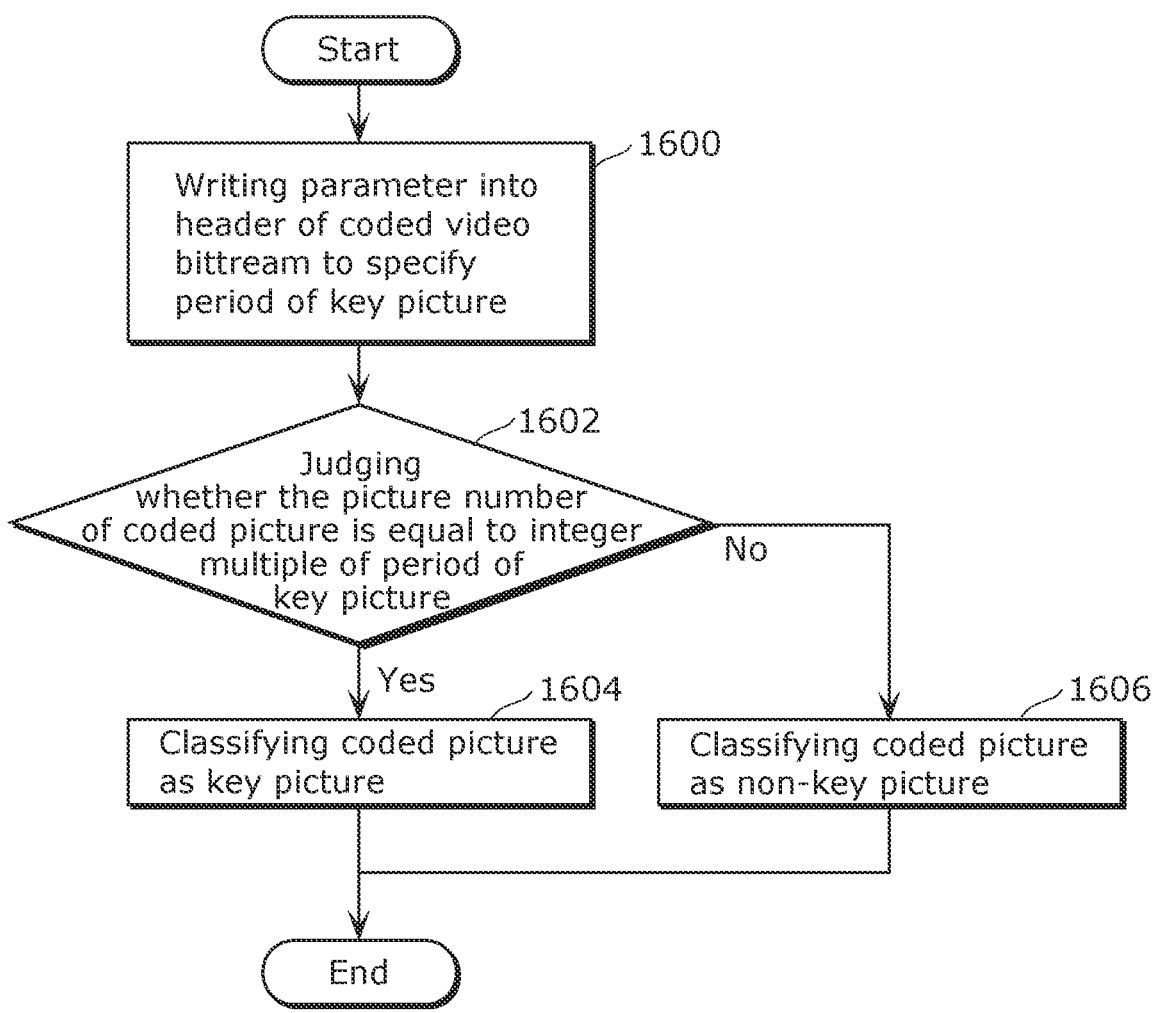
FIG. 16 is a flowchart which shows a third embodiment of the process for determining the classification indicating whether a picture is the key picture or not in the video encoding process using the resilient picture referencing scheme according to the present disclosure.

FIG. 16 is a flowchart which shows a third embodiment of the process for determining the classification indicating whether a picture is the key picture or not in the video encoding process using the resilient picture referencing scheme according to the present disclosure. First, a module 1600 writes a parameter into a header of a coded video bitstream to specify a period of key picture. Then, a module 1602 judges whether picture number of pictures (in an output order) is equal to an integer multiple of the period of key pictures. When the picture number of pictures is equal to an integer multiple of the period of key pictures, a module 1604 classifies the picture as the key picture. When the picture number of the picture is not equal to an integer multiple of the period of key pictures, a module 1606 classifies the picture as the non-key picture. Examples of the parameter value specifying the period of key pictures include the value 4 which indicates that each of the key pictures occur every 4 pictures. In this case, pictures having picture numbers 0, 4, 8, 12 and so on according to the output order are classified as the key picture, whereas all other pictures are classified as the non-key picture.

Figure 17:
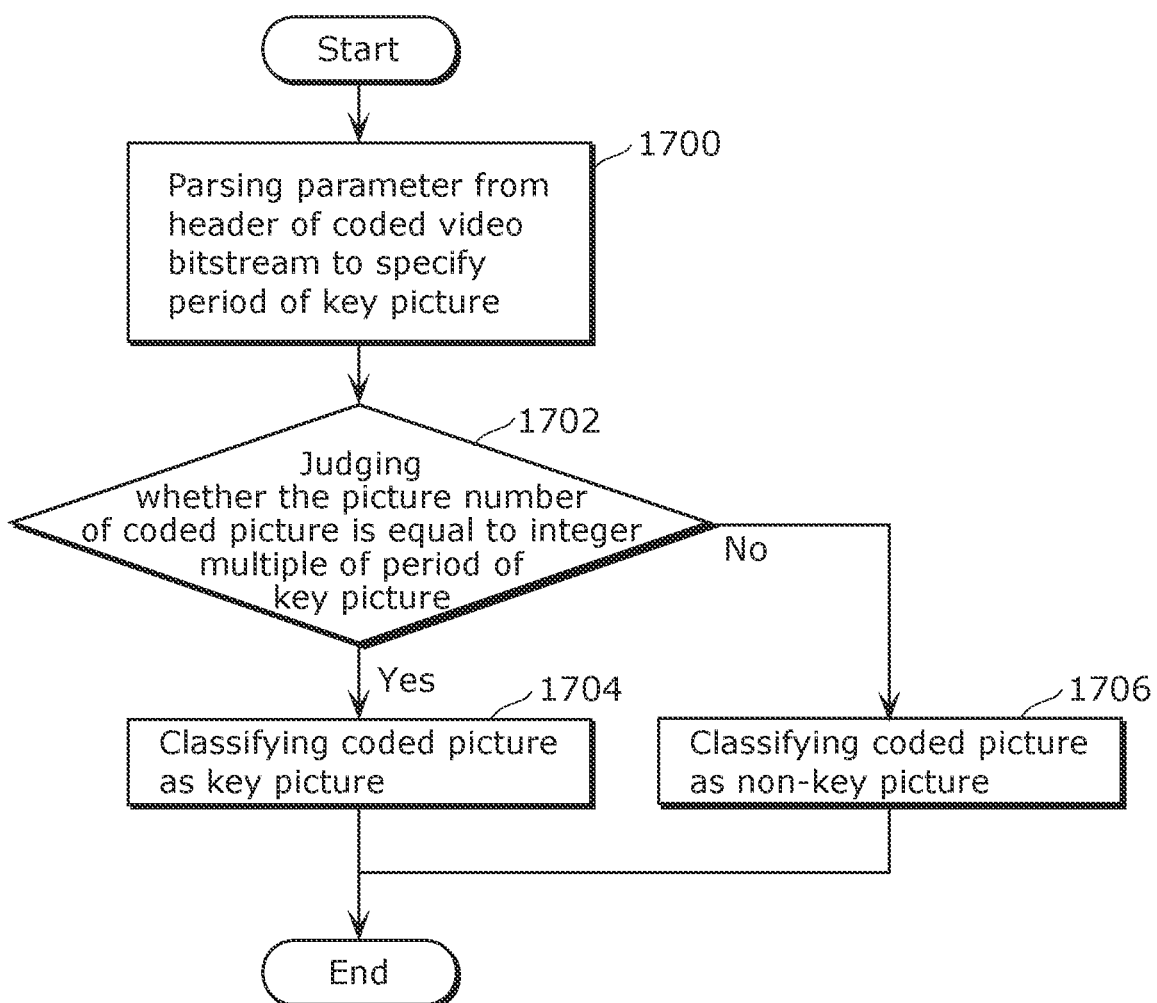
FIG. 17 is a flowchart which shows the third embodiment of the process for determining the classification indicating whether a picture is the key picture or not in the video decoding process using the resilient picture referencing scheme according to the present disclosure.

FIG. 17 is a flowchart which shows a third embodiment of the process for determining the classification indicating whether a picture is the key picture or not in the video decoding process using the resilient picture referencing scheme according to the present disclosure. First, a module 1700 parses a parameter from a header of a coded video bitstream to specify the period of key pictures. Then, a module 1702 judges whether the picture number of coded pictures (in the output order) is equal to an integer multiple of the period of key pictures. When the picture number of the coded picture is equal to the integer multiple of the period of key pictures, a module 1704 classifies the coded picture as the key picture. When the picture number of the coded picture is not equal to the integer multiple of the period of key pictures, a module 1706 classifies the coded picture as the non-key picture.

Figure 18:
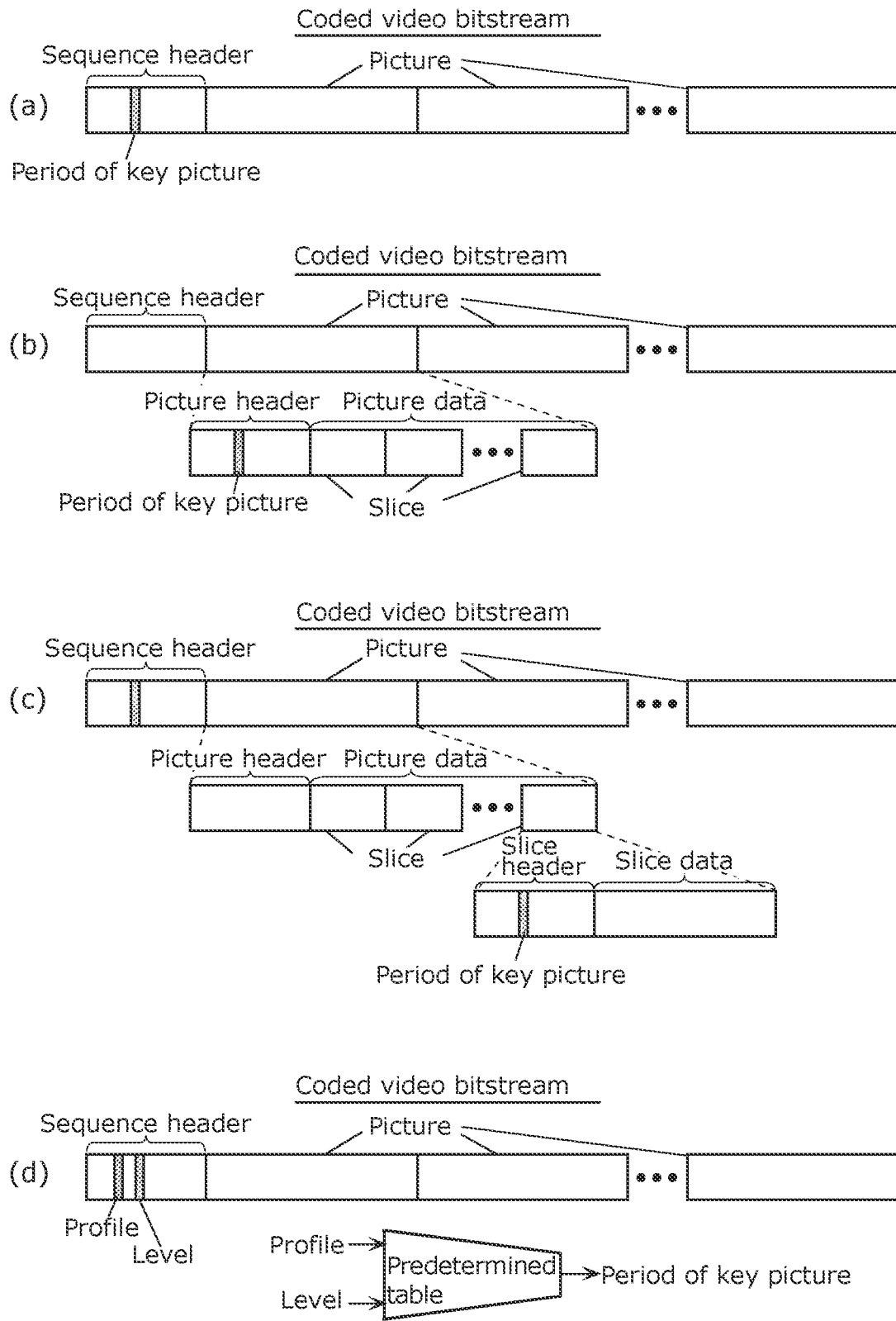
FIG. 18 is a diagram which shows a location of a parameter to specify a period of key pictures in a header of a coded video bitstream, according to the third embodiment of the process for determining the classification indicating whether a picture is the key picture or not in the video encoding process and the video decoding process using the resilient picture referencing scheme according to the present disclosure.

FIG. 18 is a diagram which shows the location of the parameter to specify the period of key pictures in a header of a coded video bitstream, according to the third embodiment of the process for determining the classification indicating whether a picture is the key picture or not in the video encoding process and the video decoding process using the resilient picture referencing scheme according to the present disclosure. A drawing (a) of FIG. 18 shows a location of the parameter in a sequence header of a compressed video bitstream. A drawing (b) of FIG. 18 shows a location of the parameter in a picture header of the compressed video bitstream. A drawing (c) of FIG. 18 shows a location of the parameter in a slice header of the compressed video bitstream. A drawing (d) of FIG. 18 shows that the parameter can also be derived from a predetermined look-up table based on a profile parameter, a level parameter, or both profile and level parameters which are located in the sequence header of the compressed video bitstream.

Figure 19:
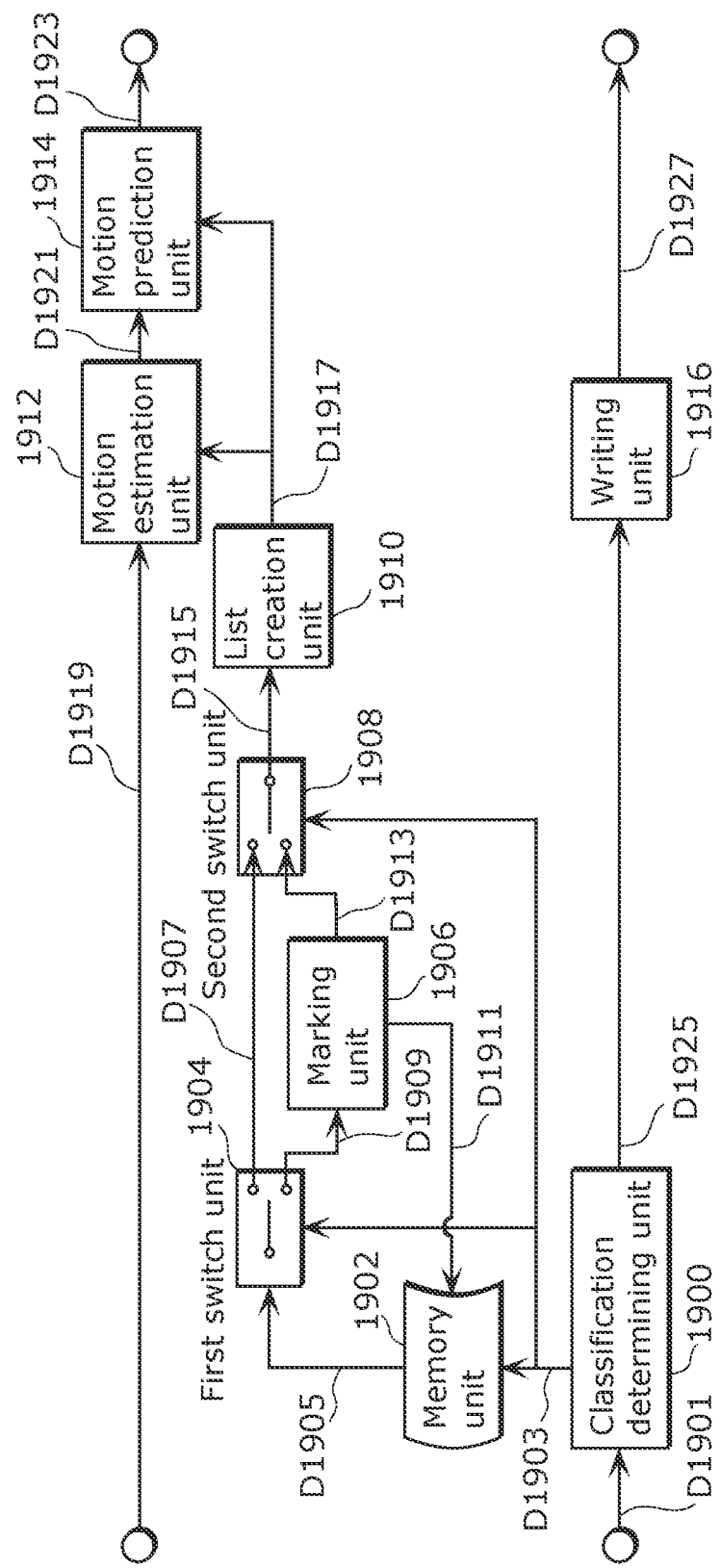
FIG. 19 is a block diagram which shows an example of a video encoding apparatus using the first embodiment of the resilient picture referencing scheme according to the present disclosure.

FIG. 19 is a block diagram illustrating an example of a video encoding apparatus using the first embodiment of the resilient picture referencing scheme according to the present disclosure. The video encoding apparatus includes a classification determining unit 1900, a memory unit 1902, a first switch unit 1904, a marking unit 1906, a second switch unit 1908, a list creation unit 1910, a motion estimation unit 1912, a motion prediction unit 1914, and a writing unit 1916.

As shown in FIG. 19, the motion estimation unit 1912 reads a block D1919 of an image sample, one or more reference picture lists D1917, and outputs a motion vector set D1921. The motion prediction unit 1914 reads the motion vector set D1921 and the reference picture list D1917 of reference pictures, and outputs a predicted sample block D1923.

The classification determining unit 1900 reads input data D1901 and performs processing thereon to produce a classification signal D1903 indicating whether a picture is the key picture or not and output data D1925. The output data D1925 is written by the writing unit 1916 into a coded video bitstream D1927.

In one possible implementation of the present disclosure using the first embodiment of the process for determining the classification indicating whether a picture is the key picture or not in the video decoding process as described referring to FIG. 10, the input data D1901 is a flag indicating a classification on whether the coded picture is the key picture or not. According to this embodiment, the classification determining unit 1900 simply passes the flag as both its outputs, i.e., the classification signal D1903 and the output data D1925.

In another possible implementation of the present disclosure using the second embodiment of the process for determining the classification indicating whether a picture is the key picture or not in the video decoding process as described referring to FIG. 13, the input data D1901 is the temporal level of a coded picture. Using the temporal level of the coded picture, the classification determining unit 1900 determines and outputs the classification signal D1903 indicating whether a picture is the key picture or not. According to this embodiment, the classification determining unit 1900 also sends, as the output data D1925, the temporal level of the coded picture to the writing unit 1916.

In yet another possible implementation of the present disclosure using the third embodiment of the process for determining the classification indicating whether a picture is the key picture or not in the video decoding process as described in FIG. 16, the input data D1901 may be the period of key pictures. Using the period of key pictures, the classification determining unit 1900 determines and outputs the classification signal D1903 indicating whether a picture is the key picture or not. According to this embodiment, the classification determining unit 1900 also sends, as the output data D1925, the period of key pictures to the writing unit 1916.

The first switch unit 1904 uses the classification signal D1903 as a control signal for switching destination of the reference pictures D1905 from the memory unit 1902, between the second switch unit 1908 when a classification signal D1903 indicates the non-key picture and the marking unit 1906 when the classification signal D1903 indicates the key picture. The marking unit 1906 checks the input reference pictures D1909, then sends a marking signal D1911 to mark a non-key-reference picture in the memory unit 1902 as unused for reference, and to output a reference picture marked as used for the reference picture D1913. The second switch unit 1908 switches selection between the reference picture D1907 and the reference picture D1913 based on the classification signal D1903. The list creation unit 1910 reads the reference picture D1915 and outputs one or more reference picture lists D1917.

Figure 20:
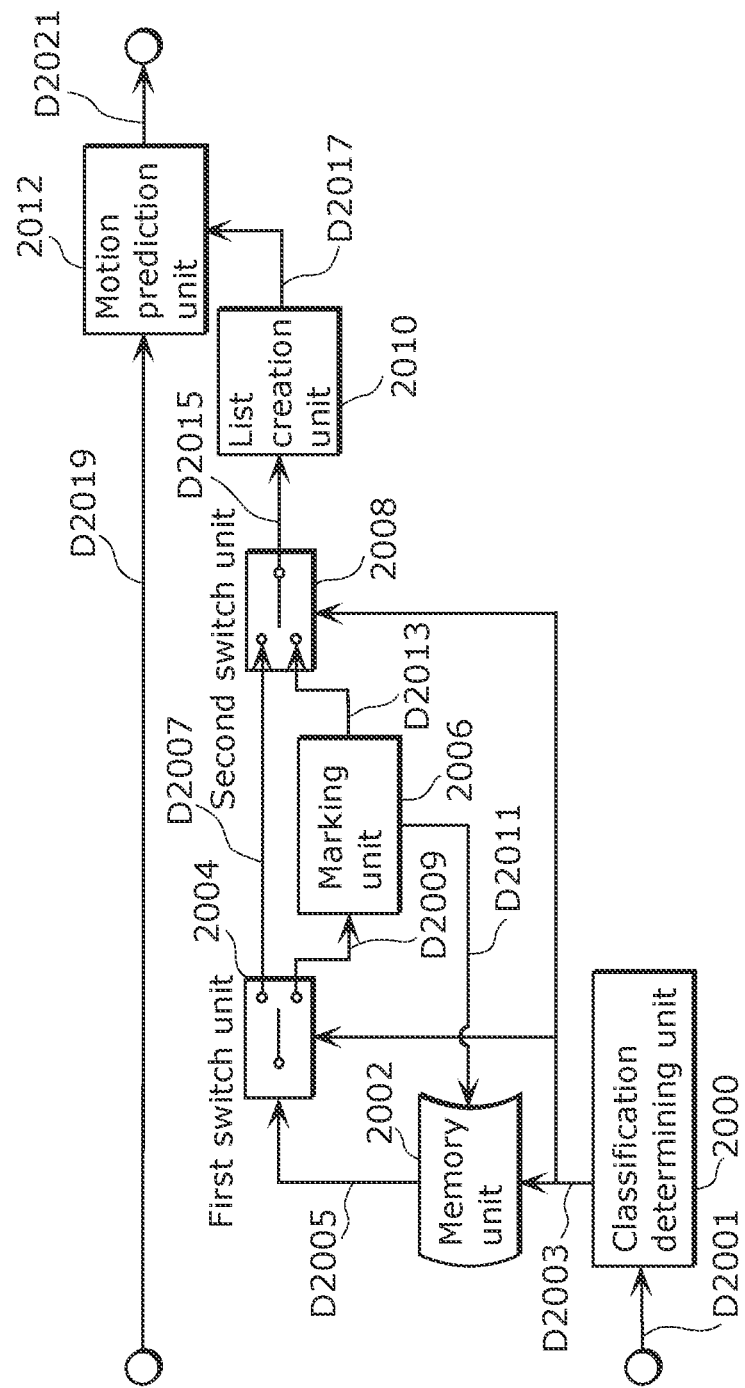
FIG. 20 is a block diagram which shows an example of a video decoding apparatus using the first embodiment of the resilient picture referencing scheme according to the present disclosure.

FIG. 20 is a block diagram which shows an example of a video decoding apparatus using the first embodiment of the resilient picture referencing scheme according to the present disclosure. The video decoding apparatus includes a classification determining unit 2000, a memory unit 2002, a first switch unit 2004, a marking unit 2006, a second switch unit 2008, a list creation unit 2010, and a motion prediction unit 2012.

As shown in FIG. 20, the motion prediction unit 2012 reads a decoded motion vector set D2019, one or more reference picture lists D2017, and outputs a predicted sample block D202.

The classification determining unit 2000 reads the input data D2001 and performs processing thereon to produce a classification signal D2003 indicating whether a picture is the key picture or not.

In one possible implementation of the present disclosure using the first embodiment of the process for determining the classification indicating whether a picture is the key picture or not in the video decoding process as described referring to FIG. 11, the parsed input data D2001 is a parsed flag indicating a classification on whether the coded picture is the key picture or not. According to this embodiment, the classification determining unit 2000 simply output the parsed flag as the classification signal D2003.

In another possible implementation of the present disclosure using the second embodiment of the process for determining the classification indicating whether a picture is the key picture or not in the video decoding process as described referring to FIG. 14, the parsed input data D2001 is the temporal level of the coded picture. Using the temporal level of the coded picture, the classification determining unit 2000 determines and outputs the classification signal D2003 indicating whether a picture is the key picture or not.

In yet another possible implementation of the present disclosure using the third embodiment of the process for determining the classification indicating whether a picture is the key picture or not as described referring to FIG. 17, the parsed input data D2001 is a parsed period of key pictures. Using the parsed period of key pictures, the classification determining unit 2000 determines and outputs the classification signal D2003 indicating whether a picture is the key picture or not.

The first switch unit 2004 uses the classification signal D2003 as a control signal for switching the destination of a reference picture D2005 from the memory unit 2002, between the second switch unit 2008 when the classification signal D2003 indicates the non-key picture, and the marking unit 2006 when the classification signal D2003 indicates the key picture. The marking unit 2006 checks the input reference pictures D2009, then sends a marking signal D2011 to mark the non-key reference picture in the picture memory 2002 as unused for reference and outputs a reference picture D2013 marked as used for reference. The second switch unit 2008 switches selection between the reference picture D2007 and the reference picture D2013 based on the classification signal D2003. The list creation unit 2010 reads the reference picture D2015 and outputs one or more reference picture lists D2017.

Figure 21:
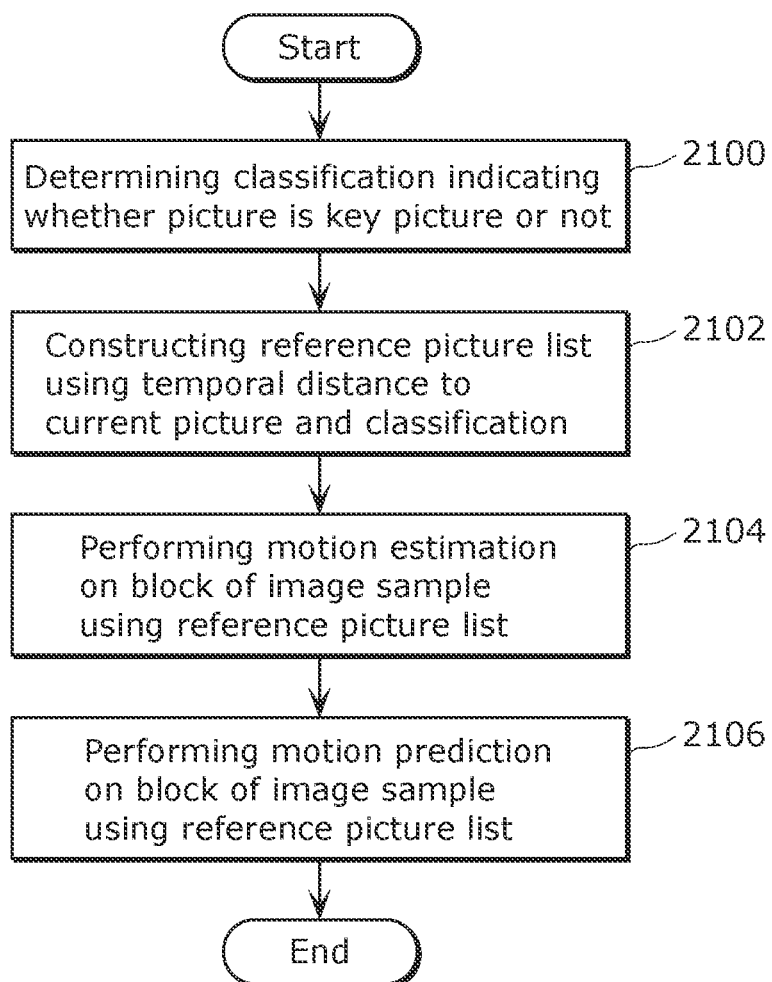
FIG. 21 is a flowchart which shows the video encoding process using a second embodiment of the resilient picture referencing scheme according to the present disclosure.

FIG. 21 is a flowchart which shows a video encoding process using the second embodiment of the resilient picture referencing scheme according to the present disclosure. A module 2100 determines a classification indicating whether a picture is the key picture or not. Detailed embodiments of the step for determining the classification indicating whether a picture is the key picture or not are given in earlier descriptions in this specification. A module 2102 then constructs a reference picture list using a temporal distance to the current picture and the classification indicating whether a picture is the key picture or not. Next, the motion estimation process is performed on the block of the image sample using the reference picture list in a module 2104, and a motion prediction process is performed on the block of the image sample using the reference picture list in module 2106.

Figure 22:
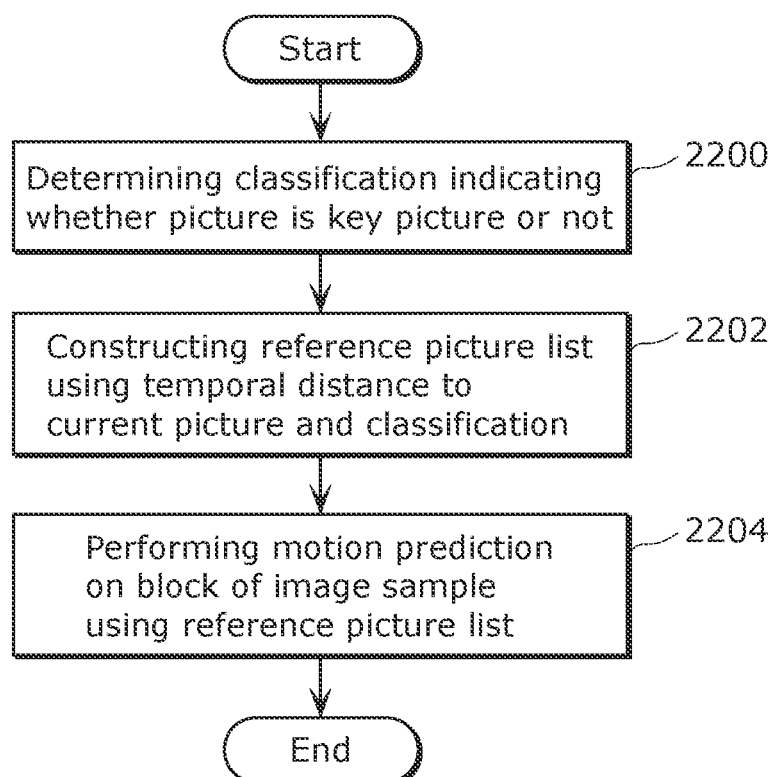
FIG. 22 is a flowchart which shows the video decoding process using the second embodiment of the resilient picture referencing scheme according to the present disclosure.

FIG. 22 is a flowchart which shows a video decoding process using the second embodiment of the resilient picture referencing scheme according to the present disclosure. A module 2200 determines a classification indicating whether a picture is the key picture or not. A module 2202 then constructs a reference picture list using the temporal distance to the current picture and the classification indicating whether a picture is the key picture or not. Next, a motion prediction process is performed on the block of the image sample using the list of the reference pictures in a module 2204.

Figure 23:
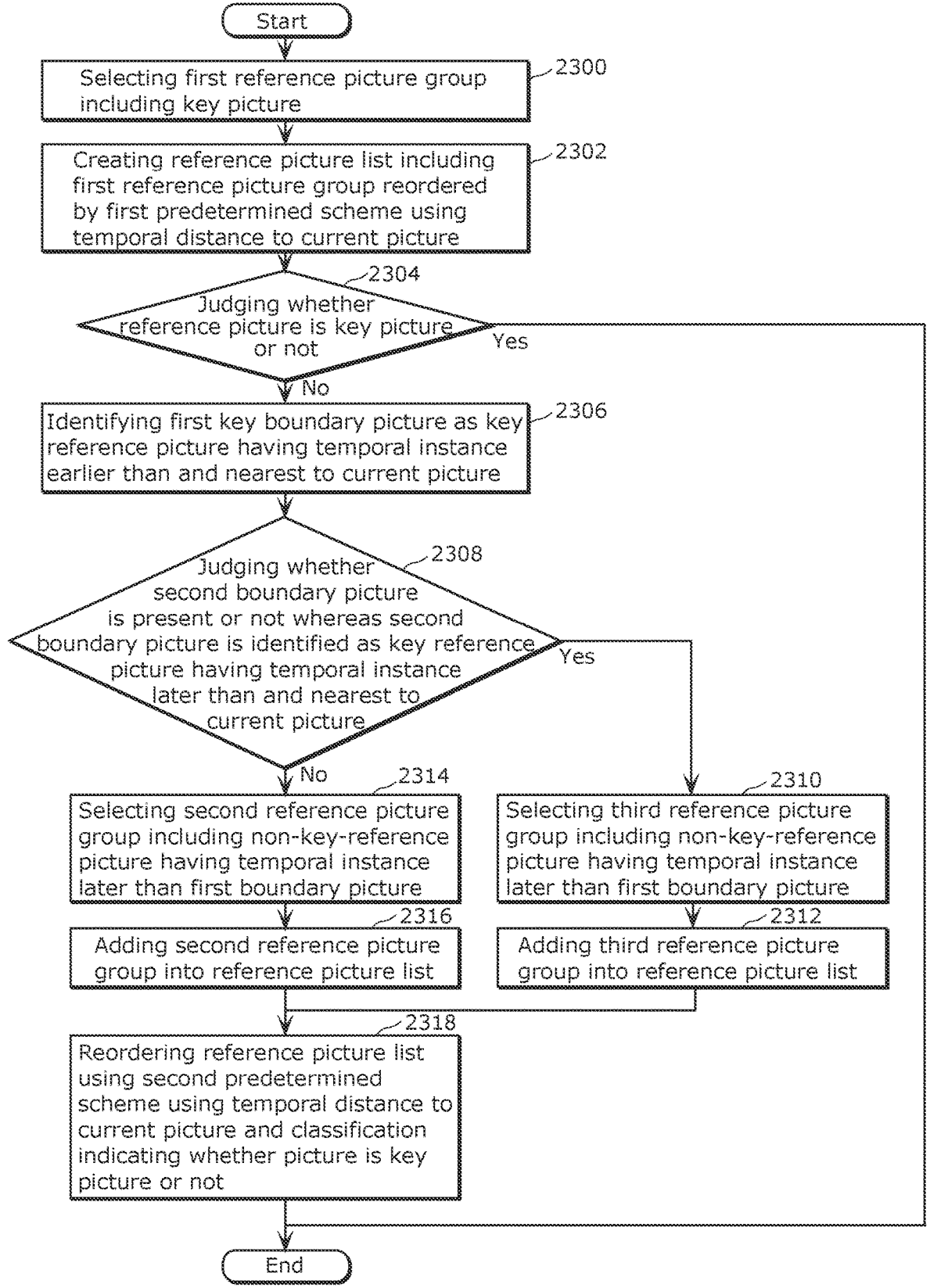
FIG. 23 is a flowchart which shows a process for constructing a reference picture list in the video encoding process and the video decoding process using a second embodiment or a third embodiment of the resilient picture referencing scheme according to the present disclosure.

FIG. 23 is a flowchart which shows the process for constructing a reference picture list in the video encoding process and the video decoding process using the second or third embodiment of the resilient picture referencing scheme according to the present disclosure. As shown in FIG. 23, a module 2300 selects a first reference picture group including a key picture. A module 2302 then creates a reference picture list including the first reference picture group sorted by a first predetermined scheme using the temporal distance to the current picture. Next, a module 2304 judges whether the current picture is the key picture or not.

When the current picture is the key picture, the reference list construction process is completed. Otherwise, when the current picture is not the key picture, a module 2306 identifies a first key boundary picture as a key reference picture having a temporal instance earlier than and nearest to the current picture. Next, a module 2308 judges whether a second boundary picture is present or not, whereas the second boundary picture is identified as the key reference picture having a temporal instance later than and nearest to the current picture.

When the second boundary picture is not present according to the judgment by module 2308, a module 2314 selects a second reference picture group including a non-key-reference picture having a temporal instance later than the first boundary picture, and a module 2316 adds the second reference picture group into the reference picture list.

When the second boundary picture is present according to judgment by the module 2308, a module 2310 selects a third reference picture group including the non-key-reference picture having a temporal instance later than the first boundary picture and earlier than the second boundary picture, and a module 2312 adds the third reference picture group into the reference picture list.

Next, regardless of whether the second boundary picture is present or not, the resulting reference picture list (after adding either second or third reference picture group) is stored by a module 2138 using a second predetermined scheme using the temporal distance to the current picture and the classification indicating whether a picture is the key picture or not.

Figure 24:
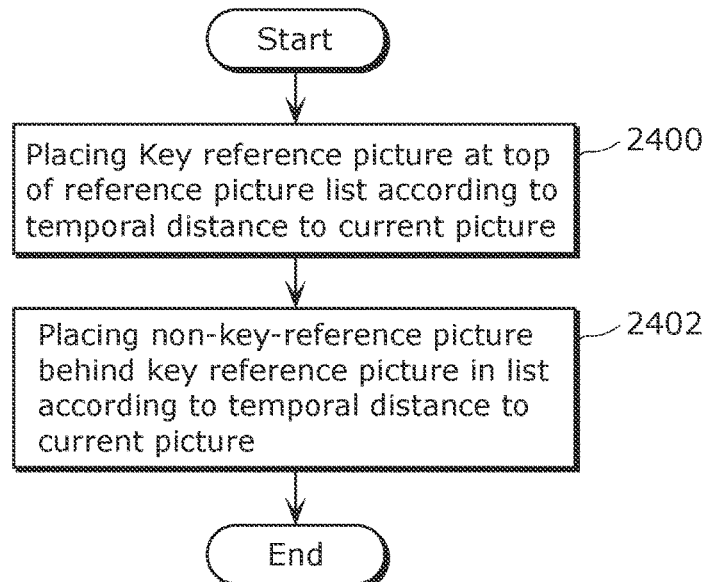
FIG. 24 is a flowchart which shows a first embodiment of a second predetermined scheme for performing sorting on the reference picture list in the video encoding process and the video decoding process using the second embodiment or the third embodiment of the resilient picture referencing scheme according to the present disclosure.

FIG. 24 is a flowchart which shows the first embodiment of the second predetermined scheme for a process of performing sorting on the reference picture list in the video encoding process and the video decoding process using the second or third embodiment of the resilient picture referencing scheme according to the present disclosure. First, a module 2400 places the key reference picture at the top of the reference picture list according to the temporal distance to the current picture. Then, a module 2402 places the non-key reference picture in the list after the key reference picture according to the temporal distance to the current picture. In one possible implementation of the second predetermined sorting scheme, the steps of placing reference pictures in the list according to the temporal distance result in sorted reference pictures in the order of increasing temporal distance to the current picture.

Figure 25:
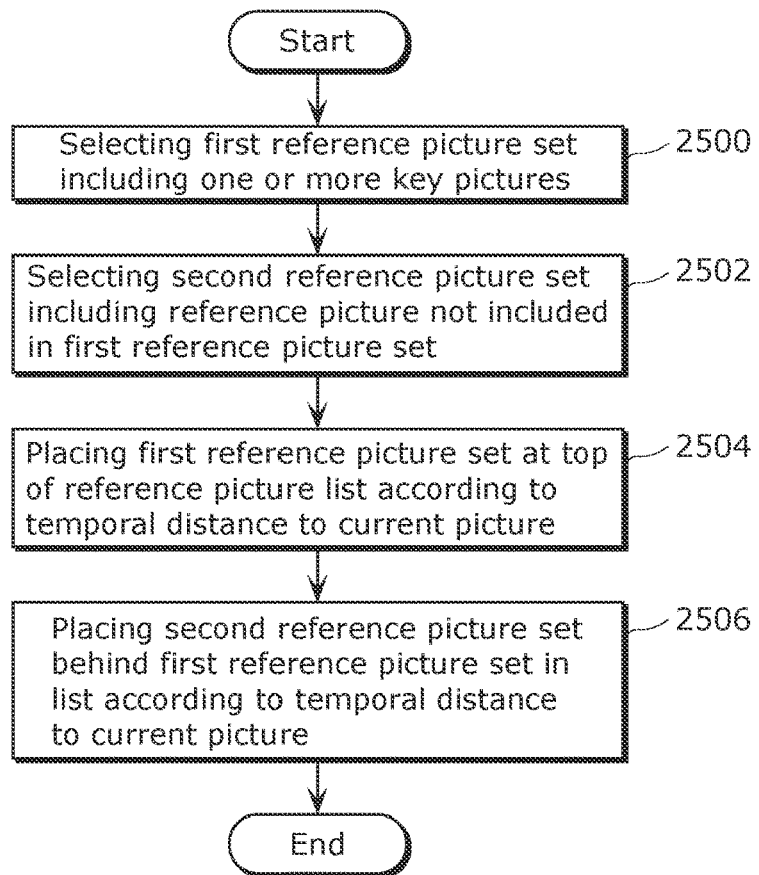
FIG. 25 is a flowchart which shows a second embodiment of the second predetermined scheme for performing the sorting on the reference picture list in the video encoding process and the video decoding process using the second embodiment or the third embodiment of the resilient picture referencing scheme according to the present disclosure.

FIG. 25 is a flowchart which shows the second embodiment of the second predetermined scheme for a process of performing sorting on the reference picture list in the video encoding process and the video decoding process using the second or third embodiment of the resilient picture referencing scheme according to the present disclosure. First, a module 2500 selects a first reference picture set including one or more key pictures. Next, a module 2502 selects a second reference picture set including reference pictures not included in the first reference picture set. A module 2504 then places the first reference picture set at the top of a reference picture list according to the temporal distance to the current picture. Lastly, a module 2506 places the second reference picture set in the list behind the first reference picture set according to the temporal distance to the current picture. In one possible implementation of the second predetermined sorting scheme, the steps of placing reference pictures in the list according to the temporal distance result in the sorted reference pictures in the order of increasing temporal distance to the current picture.

Figure 26:
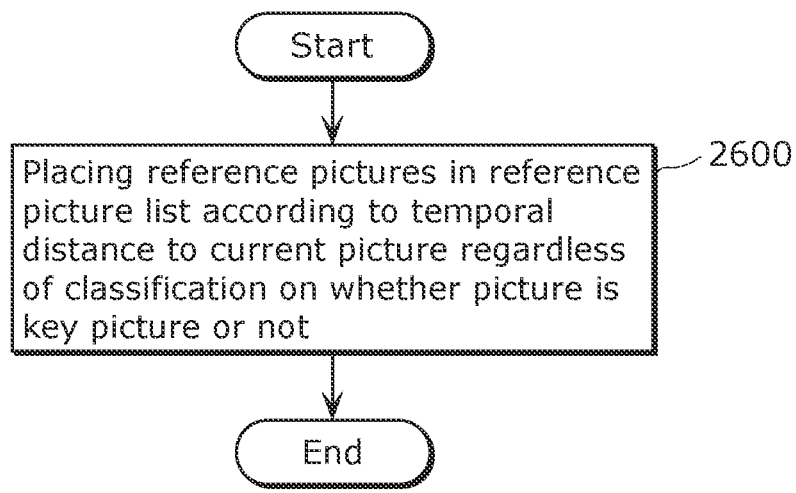
FIG. 26 is a flowchart which shows a third embodiment of the second predetermined scheme for performing the sorting on the reference picture list in the video encoding process and the video decoding process using the second embodiment or the third embodiment of the resilient picture referencing scheme according to the present disclosure.

FIG. 26 is a flowchart which shows the third embodiment of the second predetermined scheme for the process of performing sorting on the reference picture list in the video encoding process and the decoding process using the second or third embodiment of the resilient picture referencing scheme according to the present disclosure. A module 2600 places reference pictures in the reference picture list according to the temporal distance to the current picture, regardless of the classification whether a picture is the key picture or not. In one possible implementation of the second predetermined sorting scheme, the steps of placing reference pictures in the list according to the temporal distance result in the sorted reference pictures in the order of increasing temporal distance to the current picture.

Figure 27:
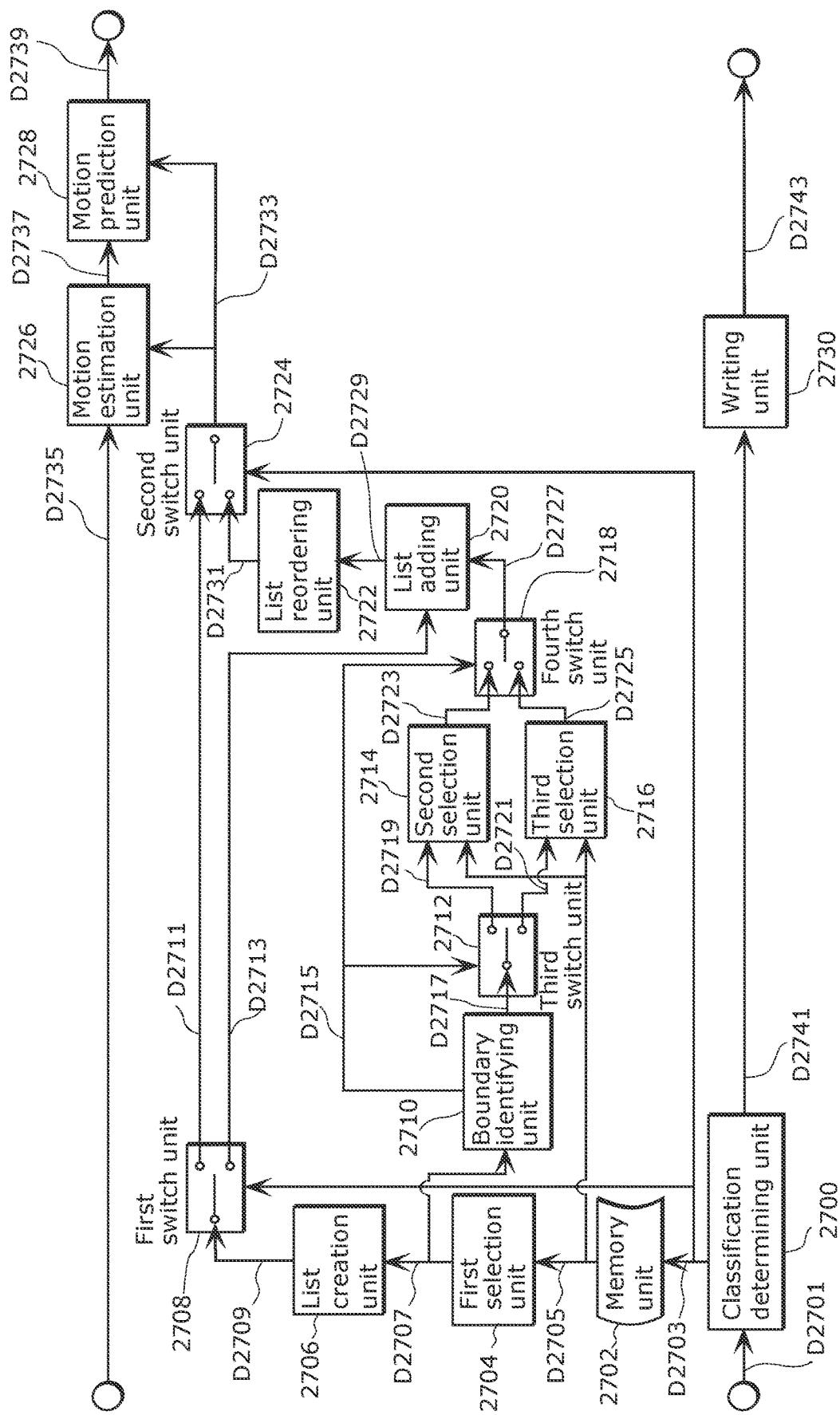
FIG. 27 is a block diagram which shows an example of the video encoding apparatus using the second embodiment of the resilient picture referencing scheme according to the present disclosure.

FIG. 27 is a block diagram which shows an example of a video encoding apparatus using the second embodiment of the resilient picture referencing scheme according to the present disclosure. The video encoding apparatus includes a classification determining unit 2700, a memory unit 2702, a first selection unit 2704, a second selection unit 2714, a third selection unit 2716, a list creation unit 2706, a first switch unit 2708, a second switch unit 2724, a boundary identifying unit 2710, a third switch unit 2712, a fourth switch unit 2718, a list adding unit 2720, a list sorting unit 2722, a motion estimation unit 2726, a motion prediction unit 2728, and a writing unit 2730.

As shown in FIG. 27, the motion estimation unit 2726 reads a block D2735 of an image sample and one or more reference picture list D2733, and outputs a motion vector set D2737. The motion prediction unit 2728 reads the motion vector set D2737 and the reference picture list D2733, and outputs a block D2739 of a predicted sample.

The classification determining unit 2700 reads the input data D2701 and performs processing thereon to produce a classification signal D2703 indicating whether a picture is the key picture or not and output data D2741. The output data D2741 is written by the writing unit 2730 into a coded video bitstream D2743.

In one possible implementation of the present disclosure using the first embodiment of the process for determining the classification indicating whether a picture is the key picture or not in the video decoding process as described referring to FIG. 10, the input data D2701 is a flag indicating the classification on whether the coded picture is the key picture or not. According to the present embodiment, the classification determining unit 2700 simply passes the flag as both its outputs, i.e., the classification signal D2703 and the output data D2741.

In another possible implementation of the present disclosure using the second embodiment of the process for determining the classification indicating whether a picture is the key picture or not in the video decoding process as described referring to FIG. 13, the input data D2701 is the temporal level of the coded picture. Using the temporal level of the coded picture, the classification determining unit 2700 determines and outputs the classification signal D2703 indicating whether a picture is the key picture or not. According to this embodiment, the classification determining unit 2700 also sends, as the output data D2741, the temporal level of a coded picture.

In yet another possible implementation of the present disclosure using the third embodiment of the process for determining the classification indicating whether a picture is the key picture or not in the video decoding process as described referring to FIG. 16, the input data D2701 may be the period of key pictures. Using the period of key pictures, the classification determining unit 2700 determines and outputs the classification signal D2703 indicating whether a picture is the key picture or not. According to this embodiment, the classification determining unit 2700 also sends, as the output data D2741, the period of key pictures.

The first selection unit 2704 reads stored reference pictures D2705 from the memory unit 2702 and passes a key reference picture D2707 to the list creation unit 2706, which creates one or more reference picture lists D2709. The first switch unit 2708 uses the classification signal D2703 as a control signal for switching the destination of the reference picture lists D2709 between the second switch unit 2724 when the classification signal D2703 indicates the key picture, and the list adding unit 2720 when the classification signal D2703 indicates the non-key picture.

The list adding unit 2720 adds a selected non-key reference picture group D2727 to the reference picture list D2713, and outputs an extended reference picture list D2729. The list sorting unit 2722 then sorts the extended reference picture list D2729 and outputs a sorted reference picture list D2731. Based on the control signal D2703, the second switch unit 2724 switches the reference picture list to be sent as a final reference picture list D2733, between the reference picture list D2711 and the reference picture list D2731.

The boundary identifying unit 2710 reads the key reference picture D2707 and identifies two boundary pictures D2717 including a first and a second boundary pictures. The boundary identifying unit 2710 also outputs a control signal D2715 indicating whether the second boundary picture is present or not. When the control signal D2715 indicates that the second boundary picture is not present, the third switch unit 2712 performs switching so as to send the boundary picture D2717 to the second selection unit 2714. The second selection unit 2714 reads a stored reference picture D2705 from the memory unit 2702 and a boundary picture D2719, then outputs a selected non-key reference picture group D2723. When the control signal D2715 indicates that the second boundary picture is not present, the third switch unit 2712 performs switching so as to send the boundary pictures D2717 to the third selection unit 2716. The third selection unit 2716 reads the stored reference pictures D2705 from the memory unit 2702 and the boundary pictures D2721, then outputs a selected non-key-reference pictures group D2725. The fourth switch unit 2718 uses the control signal D2715 to perform switching of an output to be sent as the selected non-key reference picture group D2727, between the output of the second selection unit 2714 and the output of the third selection unit 2716.

Figure 28:
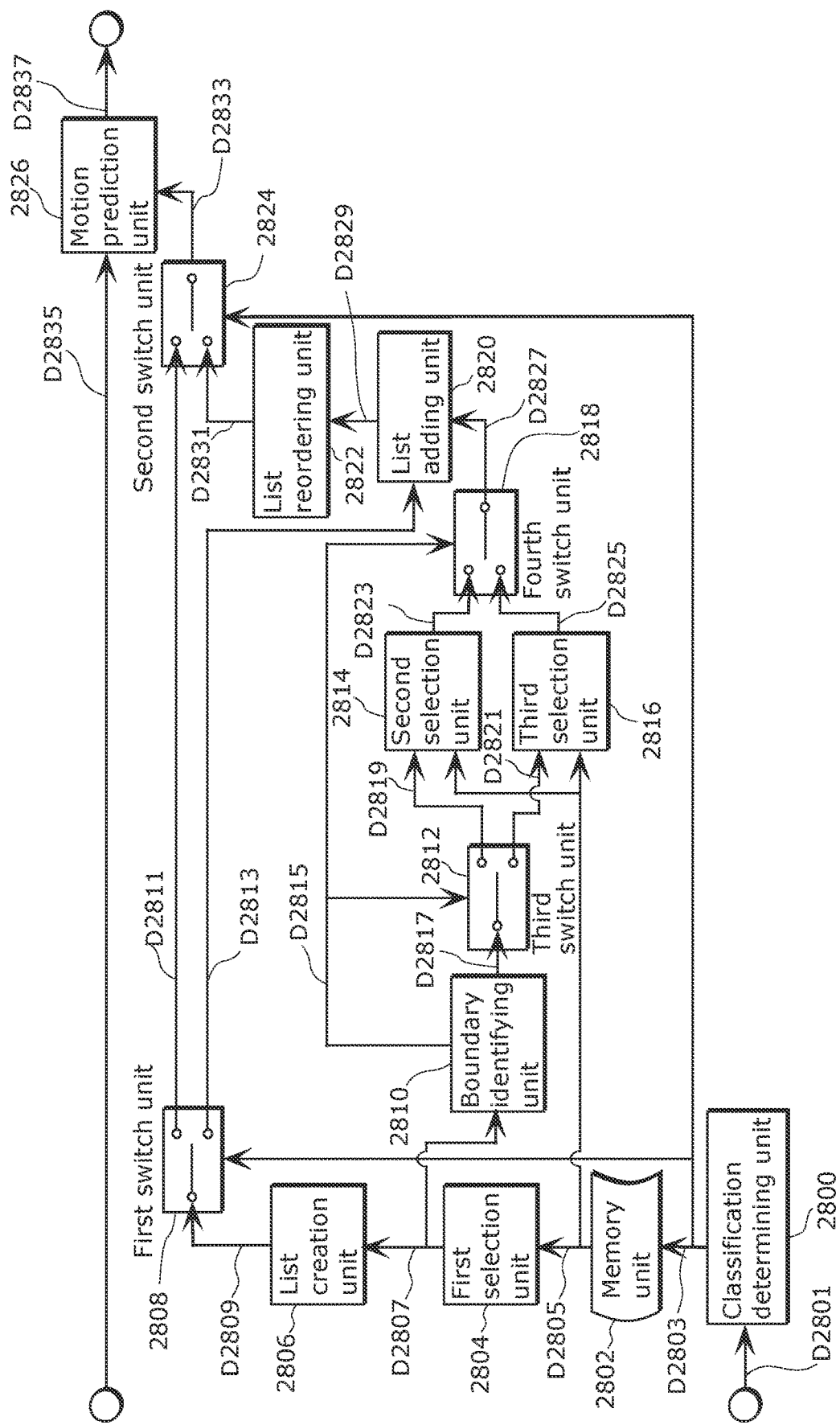
FIG. 28 is a block diagram which shows an example of the video decoding apparatus using the second embodiment of the resilient picture referencing scheme according to the present disclosure.

FIG. 28 is a block diagram which shows an example of a video decoding apparatus using the second embodiment of the resilient picture referencing scheme according to the present disclosure. The video decoding apparatus includes a classification determining unit 2800, a memory unit 2802, a first selection unit 2804, a second selection unit 2814, a third selection unit 2816, a list creation unit 2806, a first switch unit 2808, a second switch unit 2824, a boundary identifying unit 2810, a third switch unit 2812, a fourth switch unit 2818, a list adding unit 2820, a list sorting unit 2822, and a motion prediction unit 2826.

As shown in FIG. 28, the motion prediction unit 2826 reads a decoded motion vector set D2835, one or more reference picture lists D2833, and outputs a block D2837 of a predicted sample.

The classification determining unit 2800 reads the input data D2801 and performs processing thereon to produce a classification signal D2803 indicating whether a picture is the key picture or not.

In one possible implementation of the present disclosure using the first embodiment of the process for determining the classification indicating whether a picture is the key picture or not in the video decoding process as described referring to FIG. 11, the parsed input data D2801 is a parsed flag indicating a classification on whether the coded picture is the key picture or not. According to this embodiment, the classification determining unit 2800 simply outputs the parsed flag as the classification signal D2803.

In another possible implementation of the present disclosure using the second embodiment of the process for determining the classification indicating whether a picture is the key picture or not in the video decoding process as described referring to FIG. 14, the parsed input data D2801 is the temporal level of the coded picture. Using the parsed temporal level of the coded picture, the classification determining unit 2800 determines and outputs the classification signal D2803 indicating whether a picture is the key picture or not.

In yet another possible implementation of the present disclosure using the third embodiment of the process for determining the classification indicating whether a picture is the key picture or not as described referring to FIG. 17, the parsed input data D2801 is the parsed period of key pictures. Using the parsed period of key pictures, the classification determining unit 2800 determines and outputs the classification signal D2803 indicating whether a picture is the key picture or not.

The first selection unit 2804 reads a stored reference picture D2805 from the memory unit 2802 and passes a key reference pictures D2807 to the list creation unit 2806, which creates one or more reference picture lists D2809. The first switch unit 2808 uses the classification signal D2803 as a control signal for switching the destination of the reference picture lists D2809 between the second switch unit 2824 when the classification signal D2803 indicates the key picture, and the list adding unit 2820 when the classification signal D2803 indicates the non-key picture. The list adding unit 2820 adds a selected non-key reference picture group D2827 to a reference picture list D2813, and outputs an extended reference picture list D2829. The list sorting unit 2822 then sorts the extended reference picture list D2829 and outputs a sorted reference picture list D2831. Based on the control signal D2803, the second switch unit 2824 performs switching of a reference picture list to be sent as a final reference picture list D2833 between the reference picture list D2811 and the reference picture list D2813.

The boundary identifying unit 2810 reads the key reference picture D2807 and identifies two boundary pictures D2817 including a first and a second boundary pictures. The boundary identifying unit 2810 also outputs a control signal D2815 indicating whether the second boundary picture is present or not. When the control signal D2815 indicates that the second boundary picture is not present, the third switch unit 2812 performs switching so as to send the boundary picture D2817 to the second selection unit 2814. The second selection unit 2814 reads the stored reference picture D2805 from the memory unit 2802 and a boundary picture D2819, then outputs a selected non-key reference picture group D2823. When the control signal D2815 indicates that the second boundary picture is not present, the third switch unit 2812 performs switching so as to send the boundary pictures D2817 to the third selection unit 2816. The third selection unit 2816 reads the stored reference picture D2805 from the memory unit 2802 and a boundary pictures D2821, then outputs a selected non-key reference picture group D2825. The fourth switch unit 2818 uses the control signal D2815 to perform switching of an output to be sent as the selected non-key reference picture group D2827, between the output of the second selection unit 2814 and the output of the third selection unit 2816.

Figure 29:
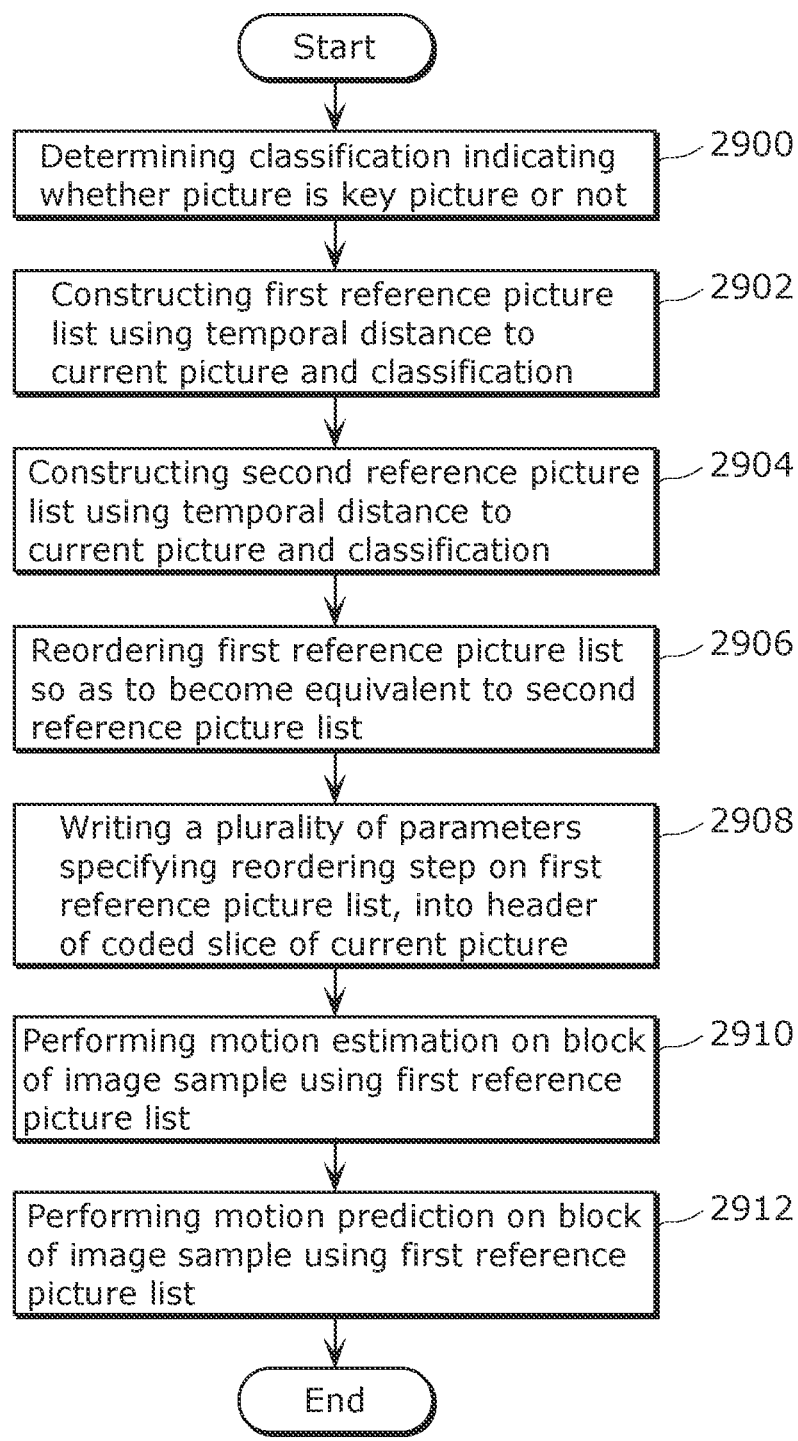
FIG. 29 is a flowchart which shows the video encoding process using the third embodiment of the resilient picture referencing scheme according to the present disclosure.

FIG. 29 is a flowchart which shows a video encoding process using the third embodiment of a resilient picture referencing scheme according to the present disclosure. A module 2900 determines the classification indicating whether a picture is the key picture or not. Detailed embodiments of the step for determining the classification indicating whether a picture is the key picture or not are given in earlier descriptions in this specification. A module 2902 then constructs a first reference picture list using the temporal distance to the current picture and the classification indicating whether a picture is the key picture or not. A module 2904 constructs a second reference picture list using the temporal distance to the current picture and the classification indicating whether a picture is the key picture or not. Detailed embodiments of the step for constructing a reference picture list using the temporal distance to the current picture and the classification are given in earlier descriptions in this specification. A module 2906 then reorders the first reference picture list so as to be equivalent to the second reference picture list. Next, a module 2908 writes a plurality of parameters specifying the steps for performing reordering in the first reference picture list into a header of a coded slice of the current picture. A motion estimation process is then performed on a block of an image sample using the first reference picture list in a module 2910, and a motion prediction process is performed on the block of the image sample using the reference picture list in a module 2912.

Figure 30:
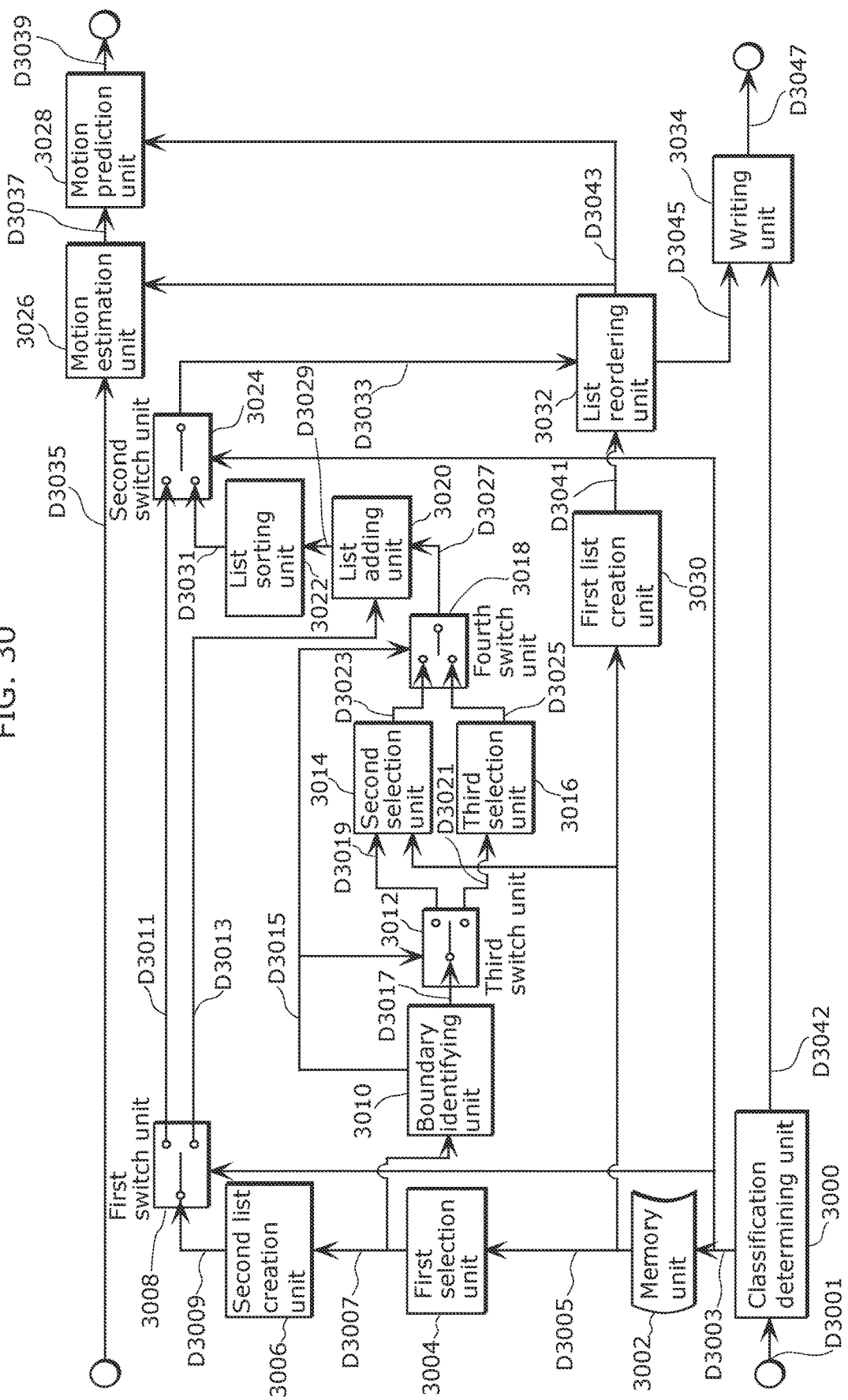
FIG. 30 is a block diagram which shows an example of the video encoding apparatus using the third embodiment of the resilient picture referencing scheme according to the present disclosure.

FIG. 30 is a block diagram which shows an example of a video encoding apparatus using the third embodiment of the resilient picture referencing scheme according to the present disclosure. The video encoding apparatus includes a classification determining unit 3000, a memory unit 3002, a first selection unit 3004, a second selection unit 3014, a third selection unit 3016, a first list creation unit 3030, a second list creation unit 3006, a first switch unit 3008, a second switch unit 3024, a boundary identifying unit 3010, a third switch unit 3012, a fourth switch unit 3018, a list adding unit 3020, a list sorting unit 3022, a motion estimation unit 3026, a motion prediction unit 3028, a list reordering unit 3032, and a writing unit 3034.

As shown in FIG. 30, the motion estimation unit 3026 reads a block D3035 of an image sample and one or more reference picture lists D3043, and outputs a motion vector set D3037. The motion prediction unit 3028 reads the motion vector set D3037, the reference picture lists D3043, and outputs a block D3039 of a predicted sample.

The classification determining unit 3000 reads input data D3001 and performs processing thereon to produce a classification signal D3003 indicating whether a picture is the key picture or not and output data D3042.

In one possible implementation of the present disclosure using the first embodiment of the process for determining the classification indicating whether a picture is the key picture or not in the video encoding process as described referring to FIG. 10, the input data D2701 is a flag indicating the classification on whether the coded picture is the key picture or not. According to this embodiment, the classification determining unit 3000 simply passes the flag as both its outputs, i.e., the classification signal D3003 and the output data D3042.

In another possible implementation of the present disclosure using the second embodiment of the process for determining the classification indicating whether a picture is the key picture or not in the video decoding process as described referring to FIG. 13, the input data D3001 is the temporal level of the coded picture. Using the temporal level of the coded picture, the classification determining unit 3000 determines and outputs the classification signal D3003 indicating whether a picture is the key picture or not. According to this embodiment, the classification determining unit 3000 also sends, as the output data D3042, the temporal level of the coded picture.

In yet another possible implementation of the present disclosure using the third embodiment of the process for determining the classification indicating whether a picture is the key picture or not in the video encoding process as described referring to FIG. 16, the input data D3001 may be the period of key pictures. Using the period of key pictures, the classification determining unit 3000 determines and outputs the classification signal D3003 indicating whether a picture is the key picture or not. According to the present embodiment, the classification determining unit 3000 also sends, as the output data D3042, the period of key pictures.

The first list creation unit 3030 reads a stored reference picture D3005 from the memory unit 3002 and creates one or more initial reference picture lists D3041. The list reordering unit 3032 takes the initial reference picture lists D3041 and the modified reference picture list D3033, then produces a final reordered reference picture list D3043 for use by the motion estimation unit 3026 and the motion prediction unit 3028. The list reordering unit 3032 also outputs a reordering step D3045 performed on the initial reference lists D3041 to become equivalent as the modified reference picture list D3033. The writing unit 3034 writes output data D3042 from the classification determining unit 3000 and the reordering steps D3045 into a coded video bitstream D3047.

The construction of the modified reference picture list D3033 is performed as follows. The first selection unit 3004 reads the stored reference picture D3005 from the memory unit 3002 and passes the key reference pictures D3007 to the second list creation unit 3006, which creates one or more reference picture lists D3009. The first switch unit 3008 uses the classification signal D3003 as a control signal for switching the destination of the reference picture lists D3009 between the second switch unit 3024 when the classification signal D3003 indicates the key picture, and the list adding unit 3020 when the classification signal D3003 indicates the non-key picture. The list adding unit 3020 adds a selected reference picture group D3027 to a reference picture list D3013, and outputs an extended reference picture list D3029. The list sorting unit 3022 then sorts the extended reference picture list D3029 and outputs a sorted reference picture list D3031. Based on the control signal D3003, the second switch unit 3024 performs switching of a reference picture list to be sent as a modified reference picture list D3033, between the reference picture list D3011 and the sorted reference picture list D3031.

The boundary identifying unit 3010 reads the key reference picture D3007 and identifies two boundary pictures D3017 including a first and a second boundary pictures. The boundary identifying unit 3010 also outputs a control signal D3015 indicating whether the second boundary picture is present or not. When the control signal D3015 indicates that the second boundary picture is not present, the third switch unit 3012 performs switching so as to send the boundary picture D3017 to the second selection unit 3014. The second selection unit 3014 reads the stored reference picture D3005 from the memory unit 3002 and a boundary picture D3019, then outputs a selected non-key reference picture group D3023. When the control signal D3015 indicates that the second boundary picture is not present, the third switch unit 3012 sends the boundary picture D3017 to the third selection unit 3016. The third selection unit 3016 reads the stored reference picture D3005 from the memory unit 3002 and a boundary picture D3021, then outputs a selected non-key reference picture group D3025. The fourth switch unit 3018 uses the control signal D3015 to perform switching of an output to be sent as a selected non-key reference picture group D3037, between the output of the second selection unit 3014 and the output of the third selection unit 3016.

Figure 31:
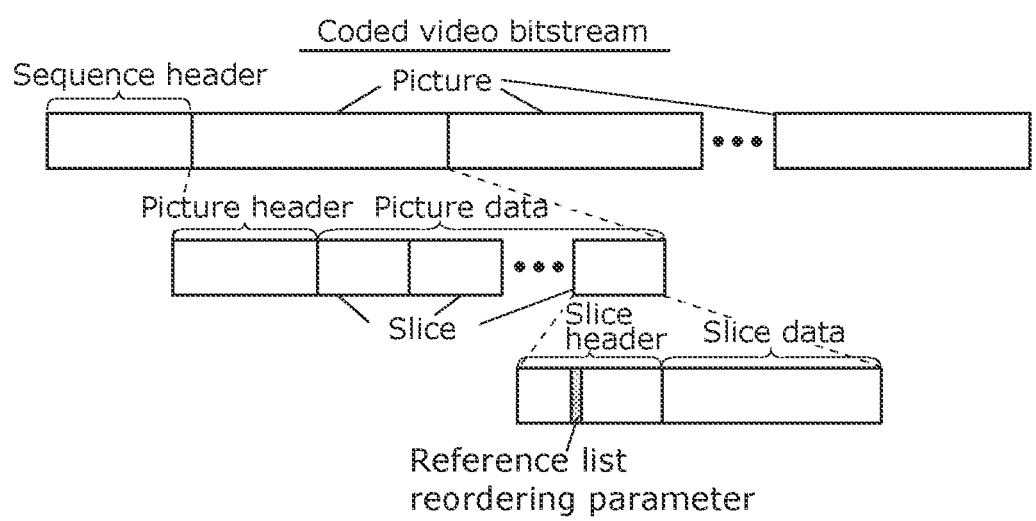
FIG. 31 is a diagram which shows a location of a parameter to specify a reference list reordering step in a slice header of a coded video bitstream.

FIG. 31 is a diagram which shows a location of the parameters to specify a reference list reordering step in a slice header of a coded video bitstream. Using the plurality of reference list reordering parameters which are parsed from a coded video bitstream, a compliant video decoding apparatus reorders a predetermined reference picture list and produces an equivalent modified reference picture list to be used in the encoding process.

Fourth Embodiment

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 32:
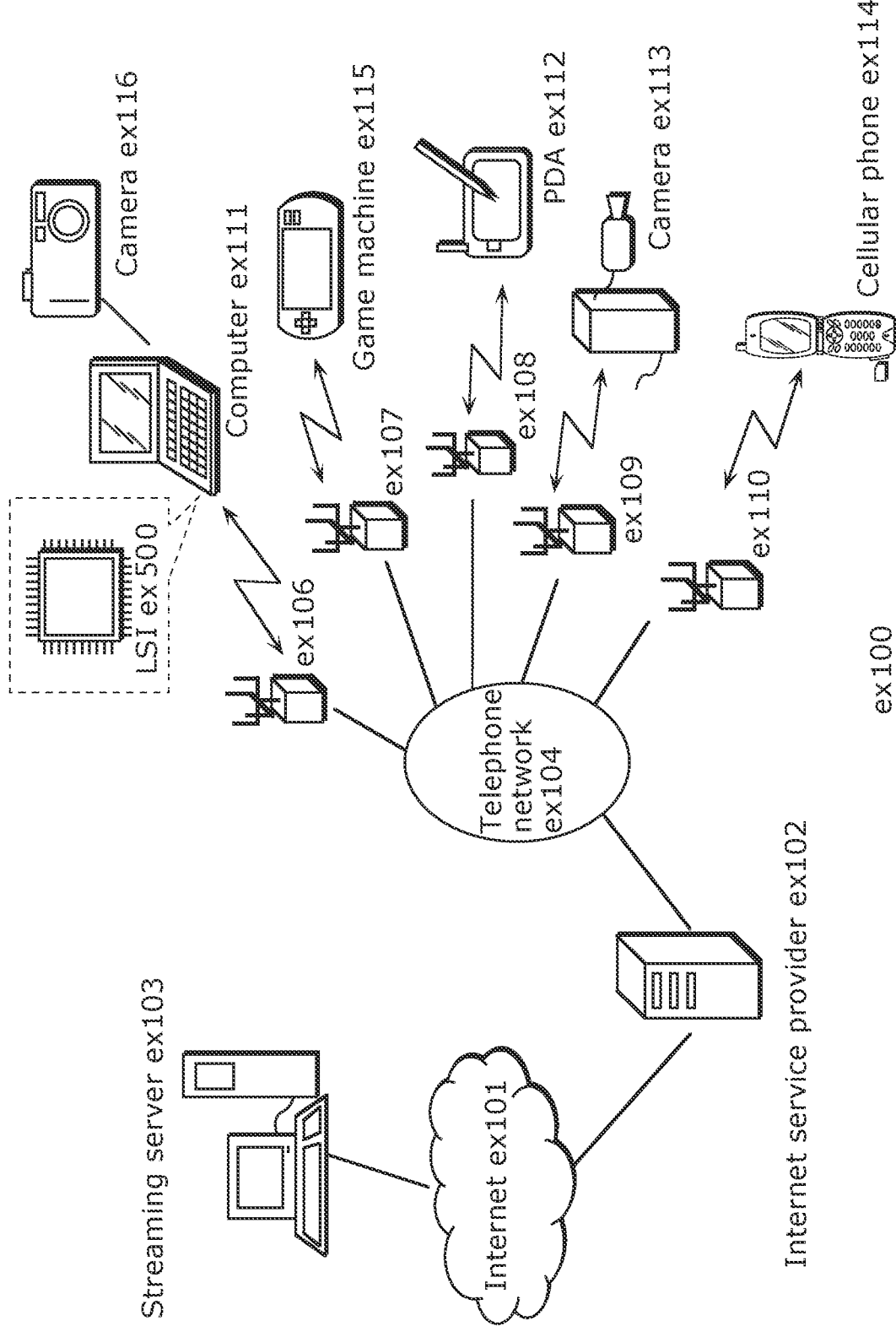
FIG. 32 is a diagram which shows an overall configuration of a content providing system for implementing content distribution services.

FIG. 32 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 32, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 33:
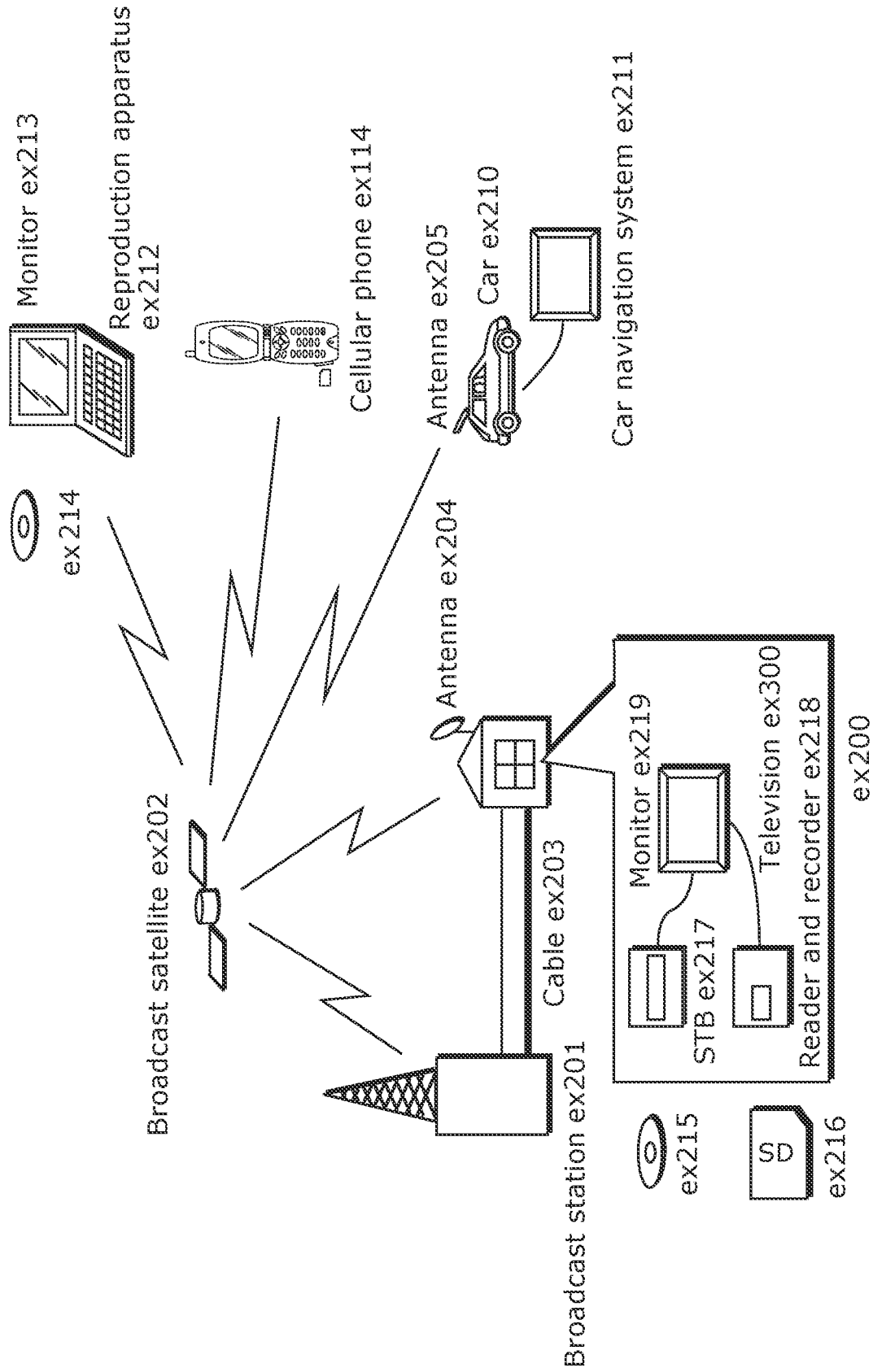
FIG. 33 is a diagram which shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 33. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 34:
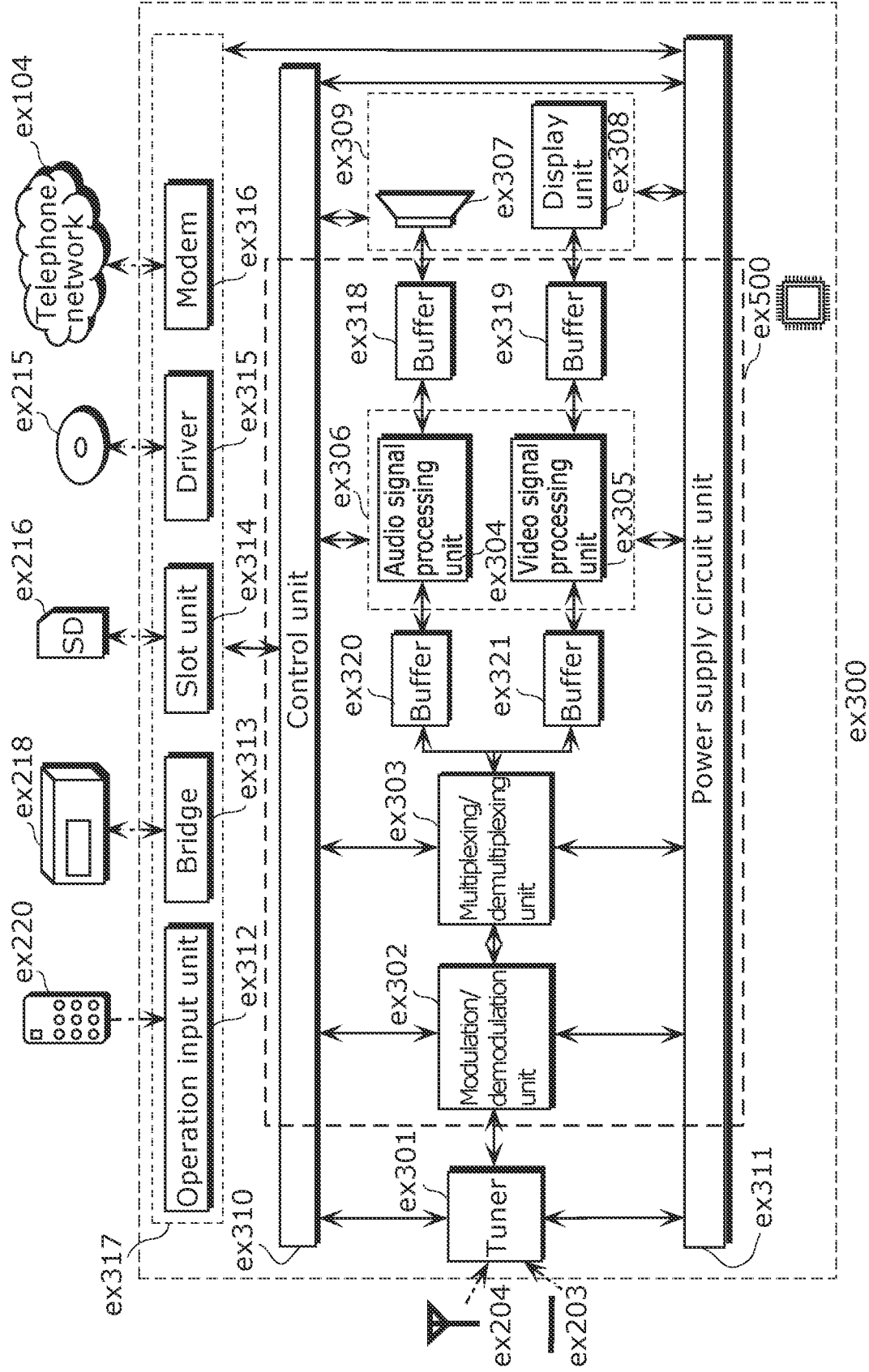
FIG. 34 is a block diagram which shows a configuration example of a television.

FIG. 34 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc., that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 35:
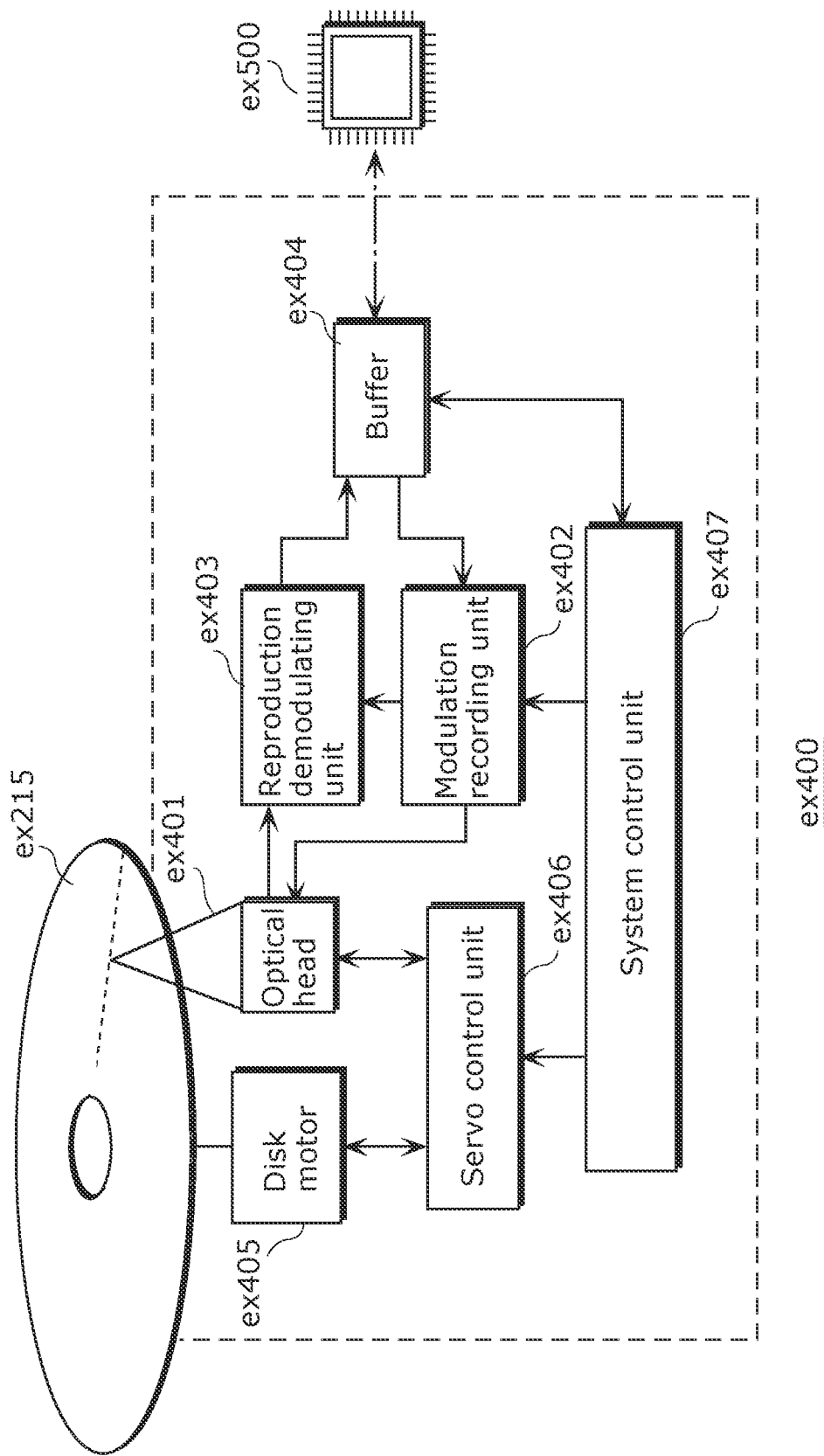
FIG. 35 is a block diagram which shows a configuration example of an information reproducing/recording unit that reads and writes information from and on a recording medium that is an optical disk.

As an example, FIG. 35 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 36:
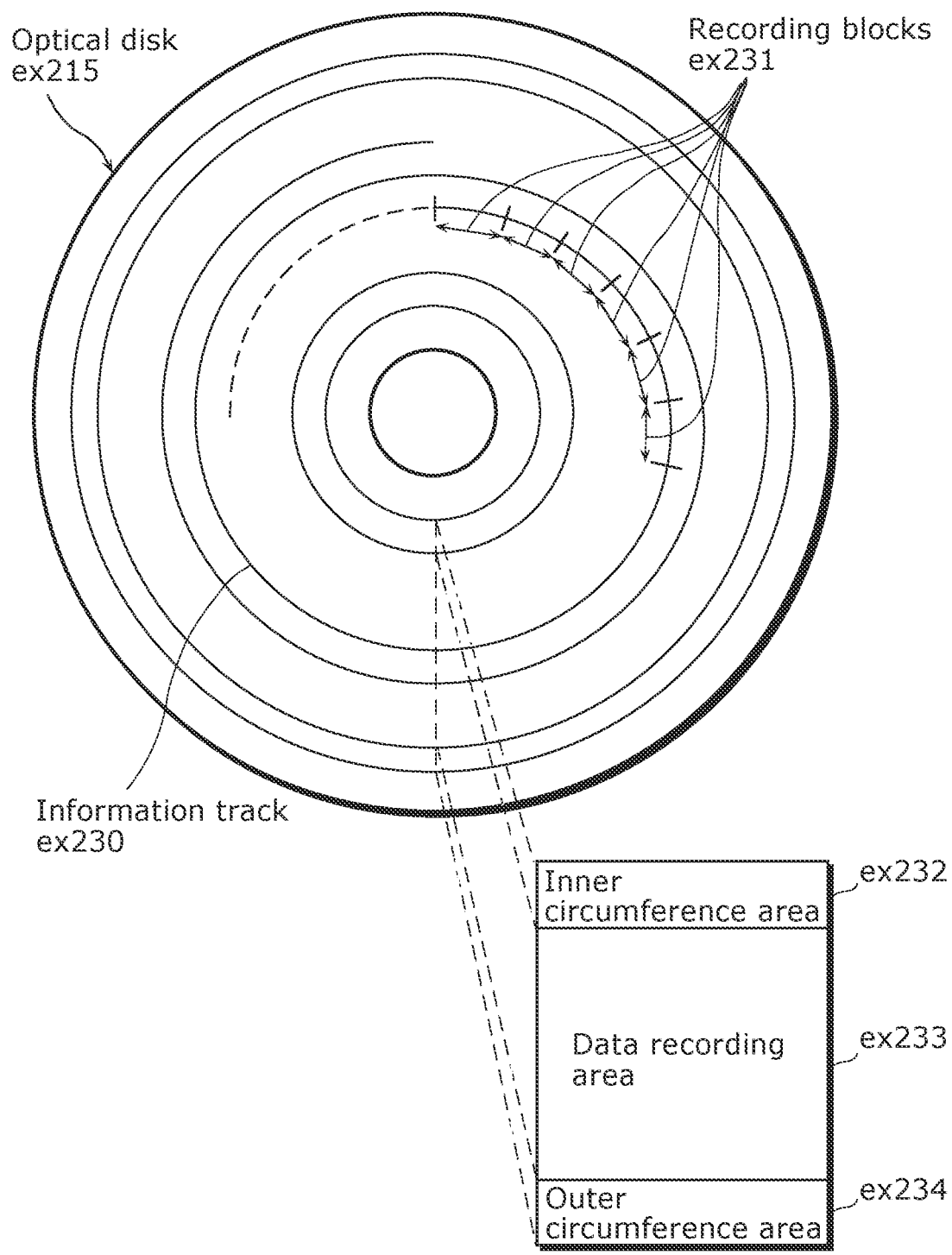
FIG. 36 is a diagram which shows a configuration example of a recording medium that is an optical disk.

FIG. 36 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 34. The same will be true for the configuration of the computer ex111, the cellular phone ex114, and others.

Figure 37A:
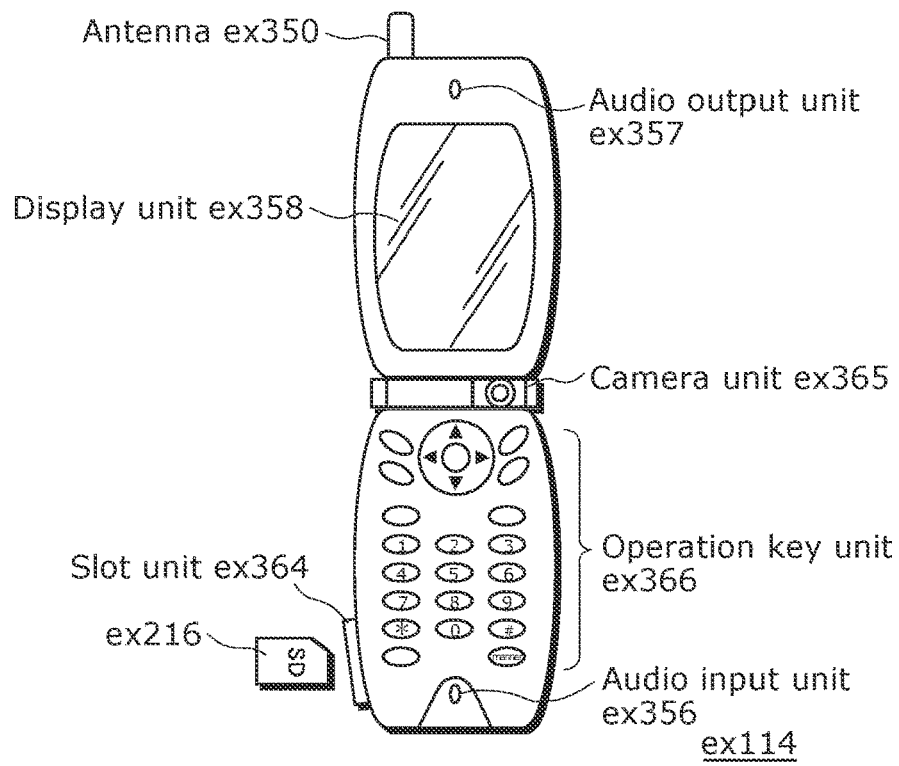
FIG. 37A is a diagram which shows an example of a cellular phone.

FIG. 37A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 37B:
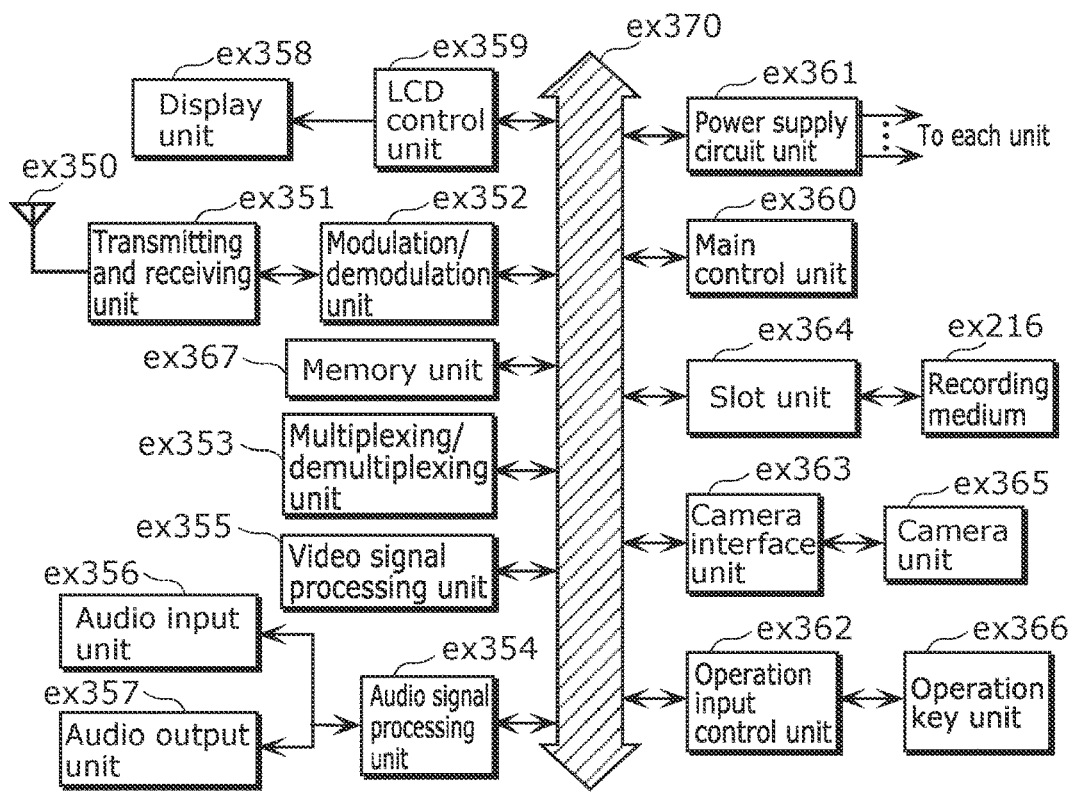
FIG. 37B is a block diagram which shows a configuration example of a cellular phone.

Next, an example of a configuration of the cellular phone ex114 will be described with reference to FIG. 37B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Fifth Embodiment

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In view of the above, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 38 illustrates a structure of the multiplexed data. As illustrated in FIG. 38, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 39:
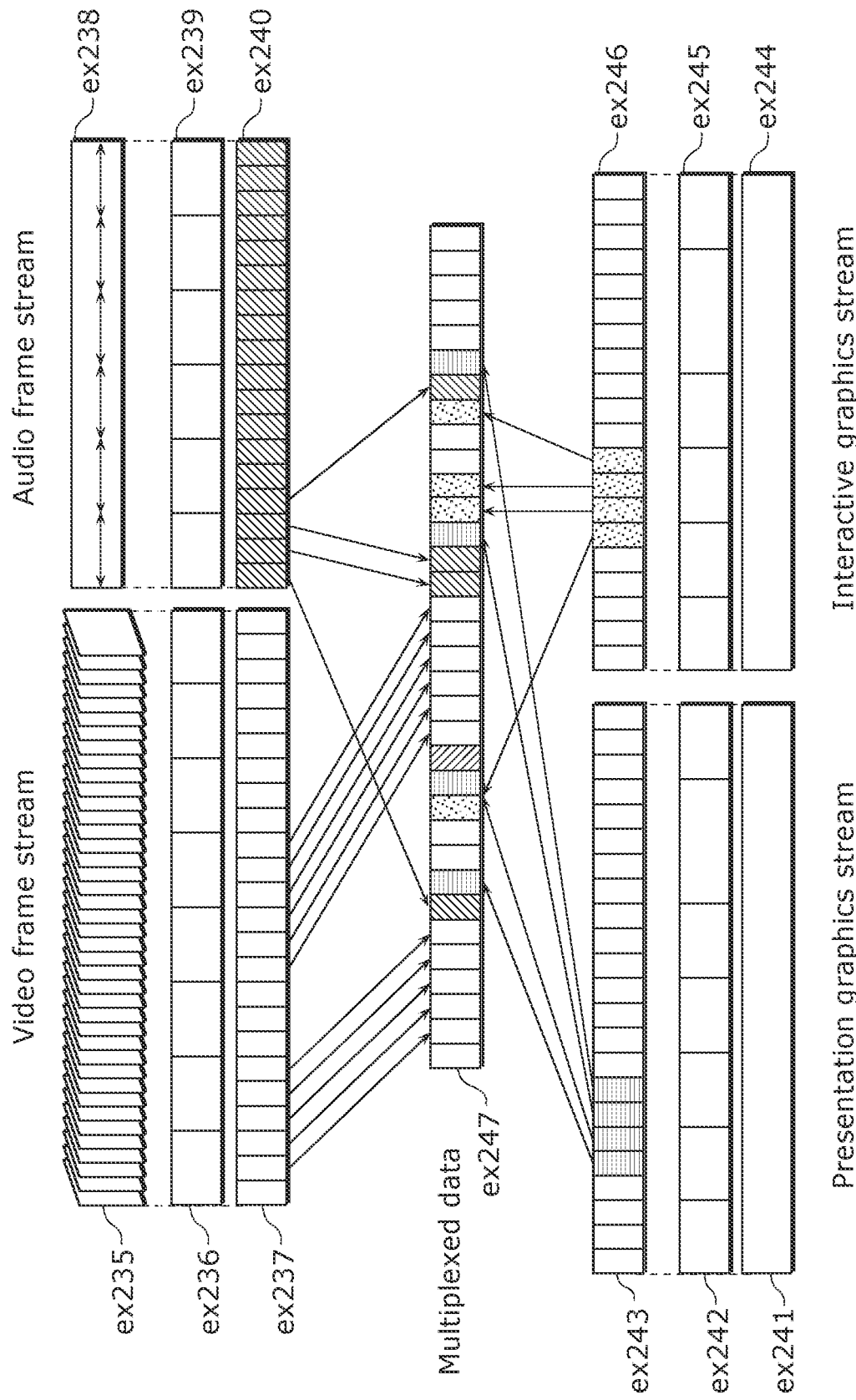
FIG. 39 is a diagram which schematically shows how each stream is multiplexed in multiplexed data.

FIG. 39 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 40:
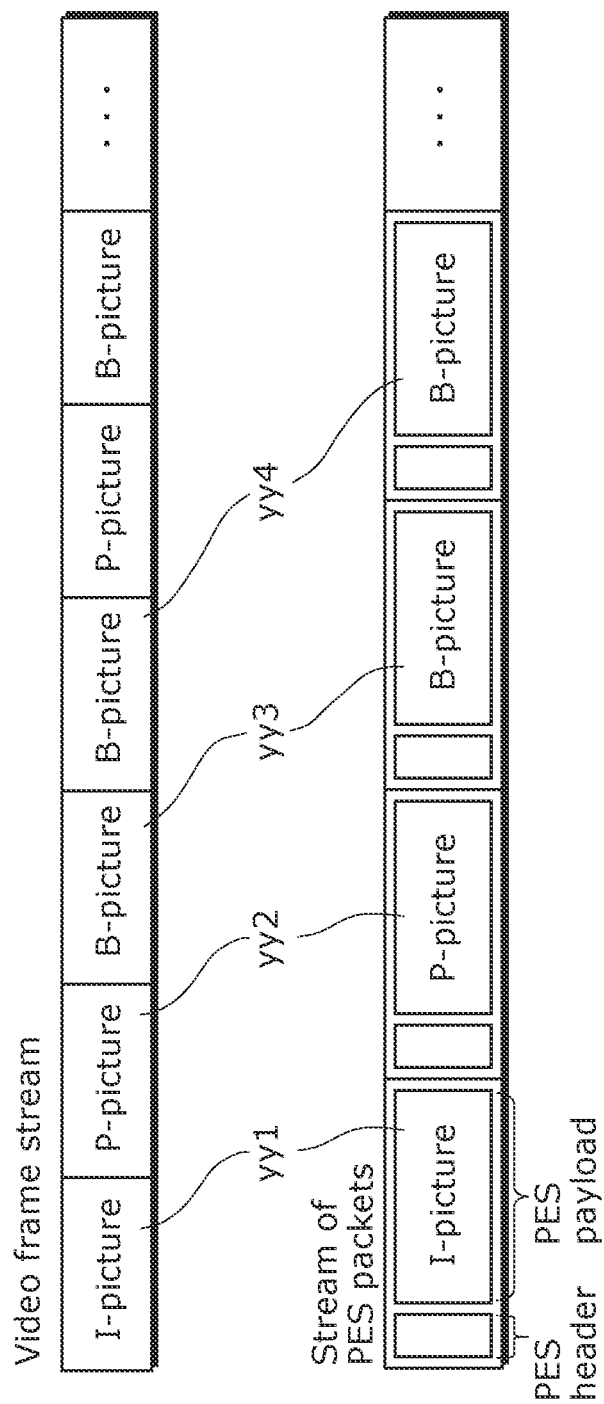
FIG. 40 is a diagram which shows how a video stream is stored in a stream of PES packets in more detail.

FIG. 40 illustrates how a video stream is stored in a stream of PES packets in more detail. The first bar in FIG. 40 shows a video frame stream in a video stream. The second bar shows the stream of PES packets. As indicated by arrows denoted as yy1, yy2, yy3, and yy4 in FIG. 40, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 41:
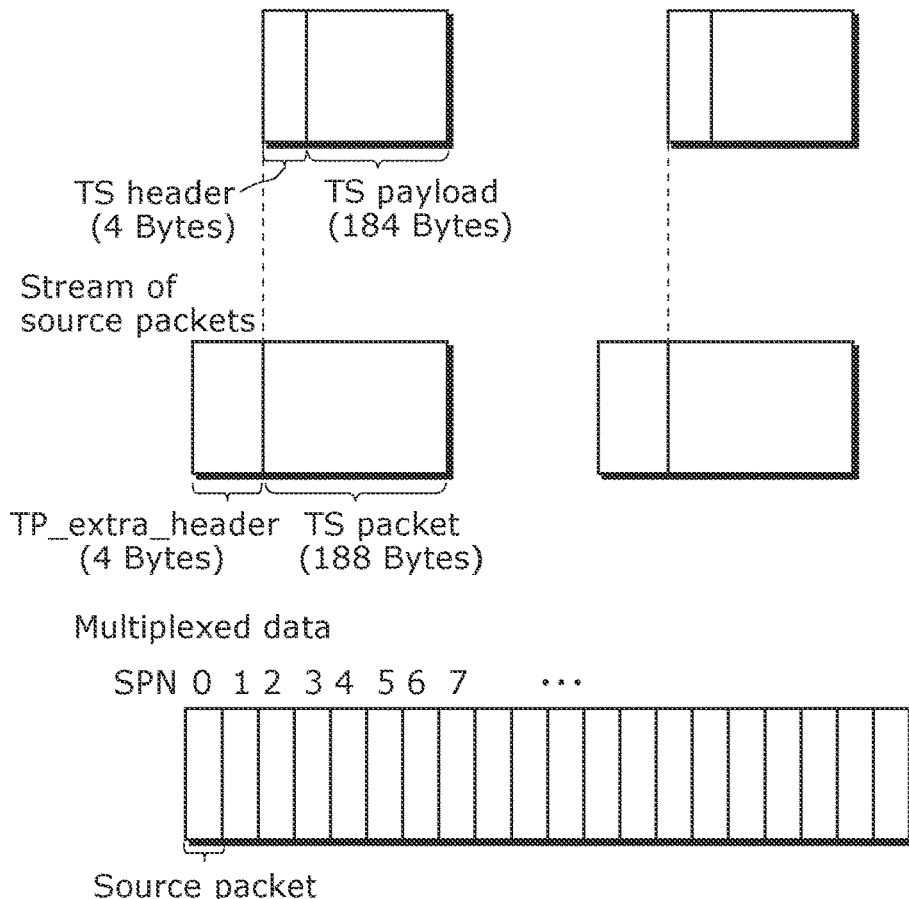
FIG. 41 is a diagram which shows a structure of TS packets and source packets in the multiplexed data.

FIG. 41 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 41. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 42:
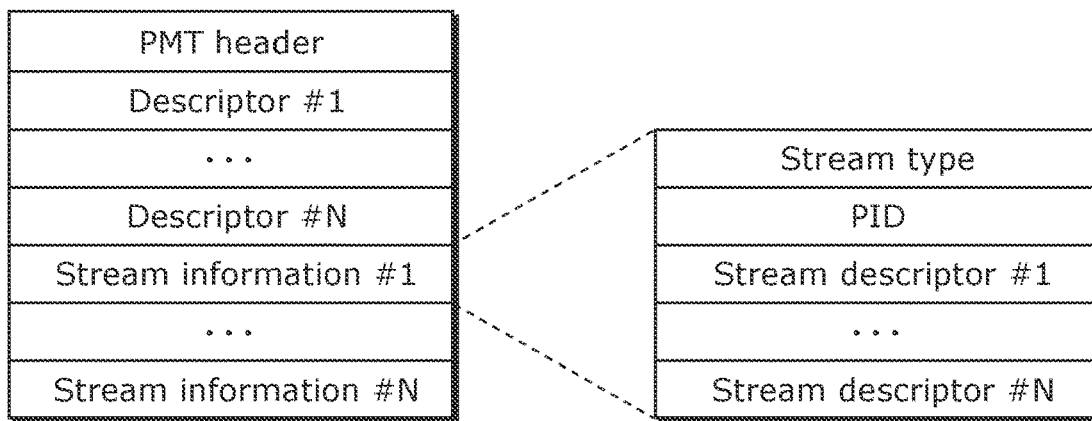
FIG. 42 is a diagram which shows a data structure of a PMT.

FIG. 42 illustrates the data structure of the PMT in detail A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 43:
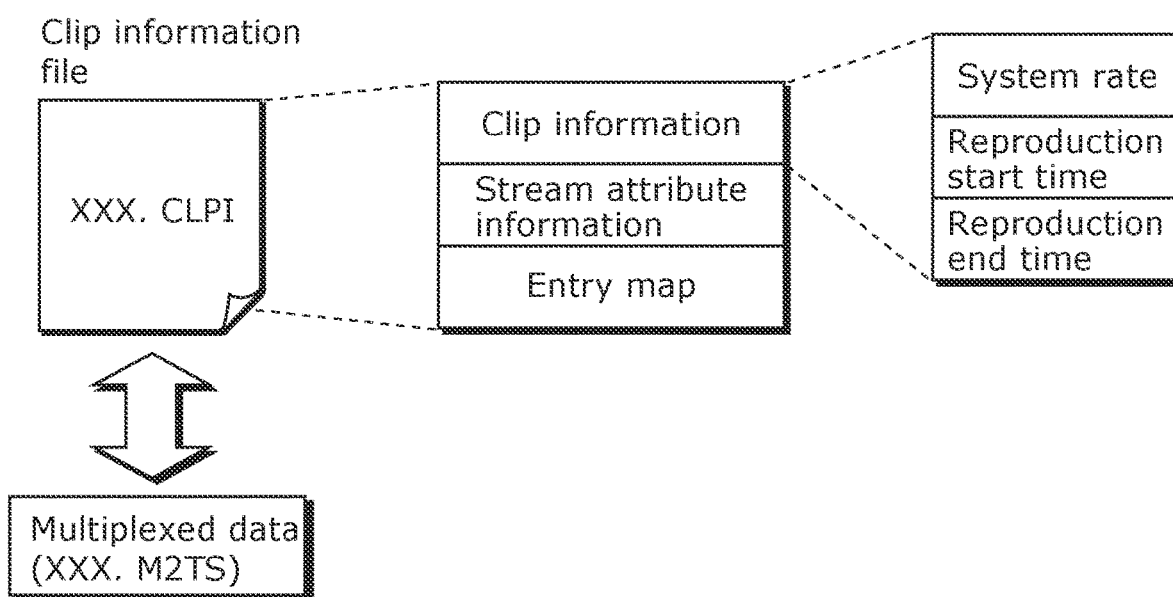
FIG. 43 is a diagram which shows an internal structure of multiplexed data information.

Each of the multiplexed data information files is management information of the multiplexed data as shown in FIG. 43. The multiplexed data information files are in one to one correspondence with the multiplexed data, and each of the files includes multiplexed data information, stream attribute information, and an entry map.

As illustrated in FIG. 43, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 44:
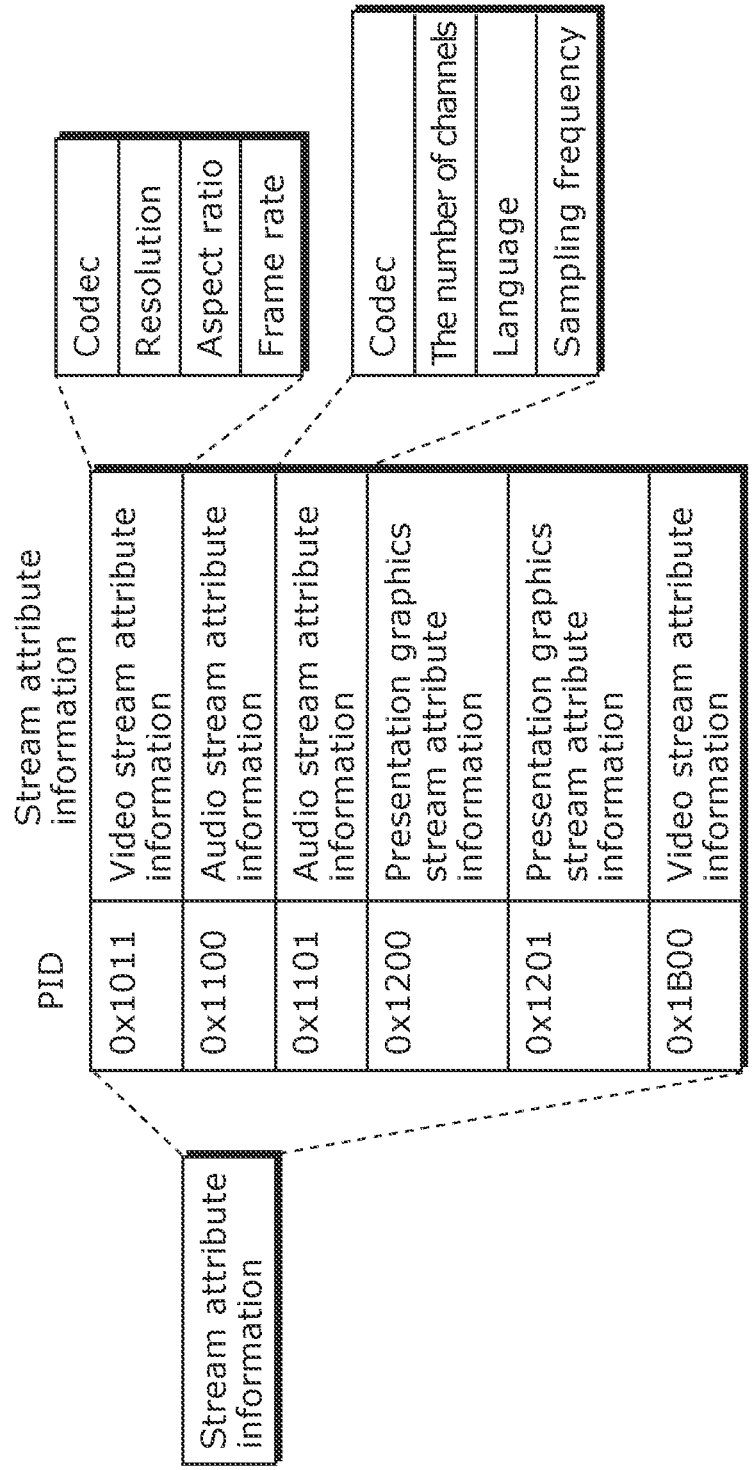
FIG. 44 is a diagram which shows an internal structure of stream attribute information.

As shown in FIG. 44, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 45:
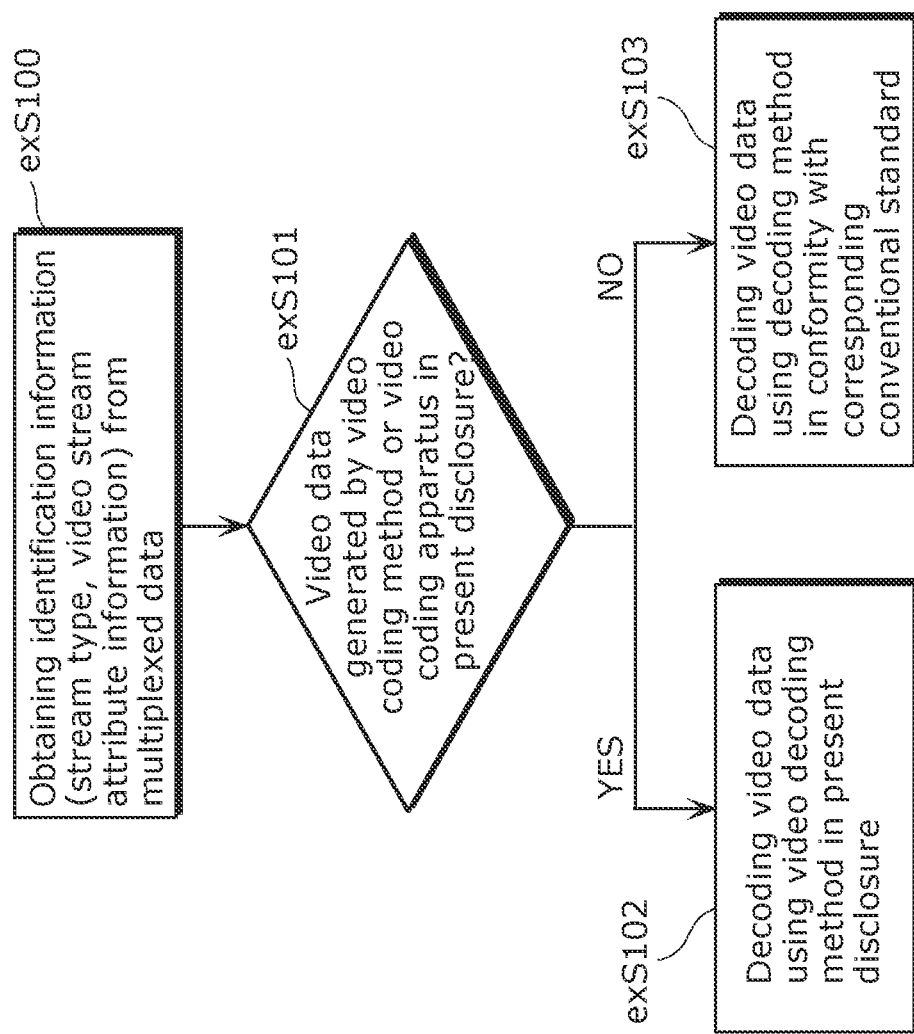
FIG. 45 is a diagram which shows steps for identifying video data.

Furthermore, FIG. 45 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by selecting a reference picture or a motion vector from candidates according to the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards For example, when the attribute information shows that the stream conforms to the MPEG-4 AVC standard, the stream is decoded on a block-by-block basis using a motion vector not selected from the candidates but calculated from a motion vector of at least one block that is spatially or temporally adjacent to a current block.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Sixth Embodiment

Figure 46:
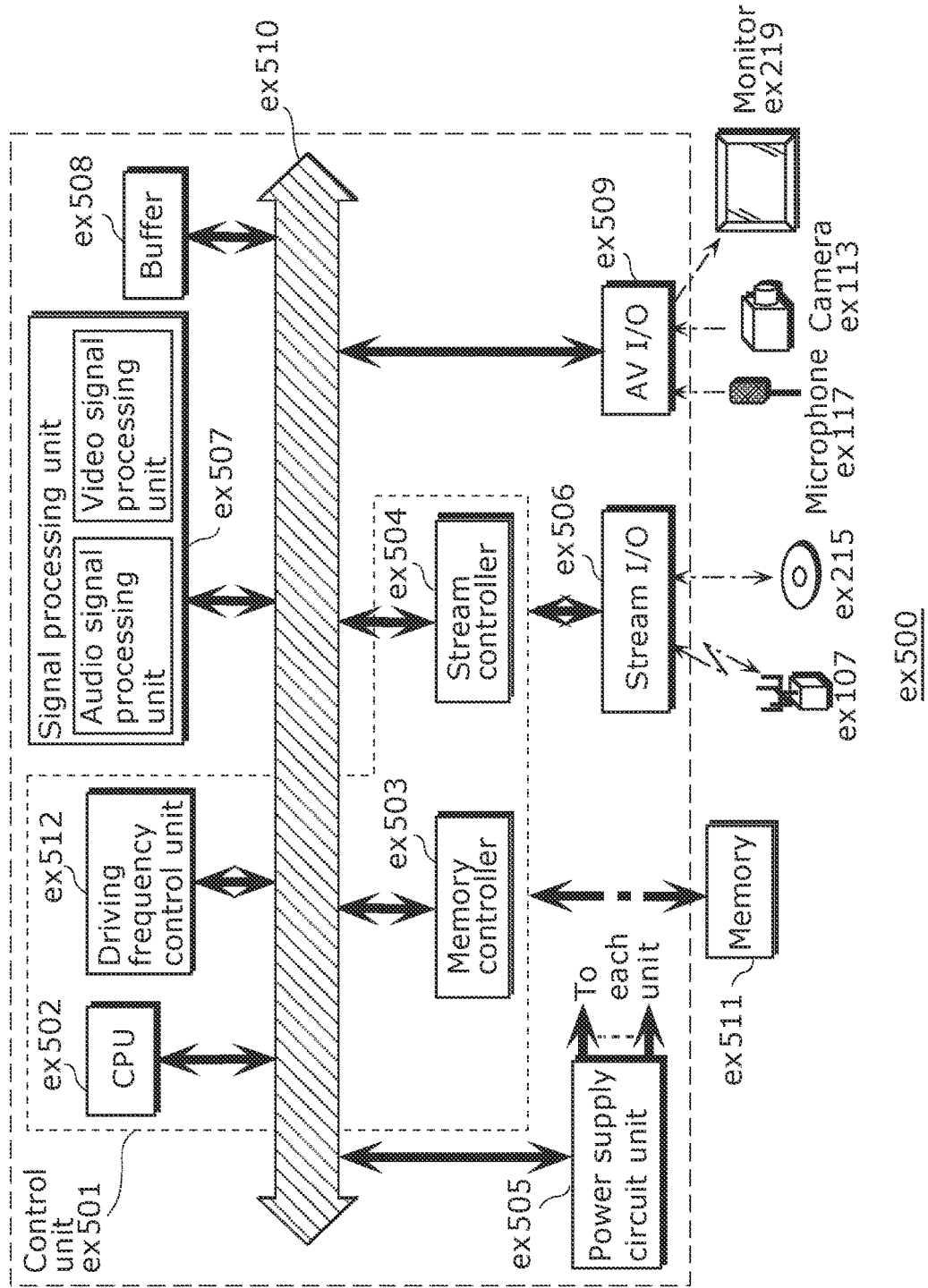
FIG. 46 is a block diagram which shows a configuration example of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 46 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a dedicated circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method and/or the moving picture decoding method according to any of the above embodiments, by, loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Seventh Embodiment

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 47:
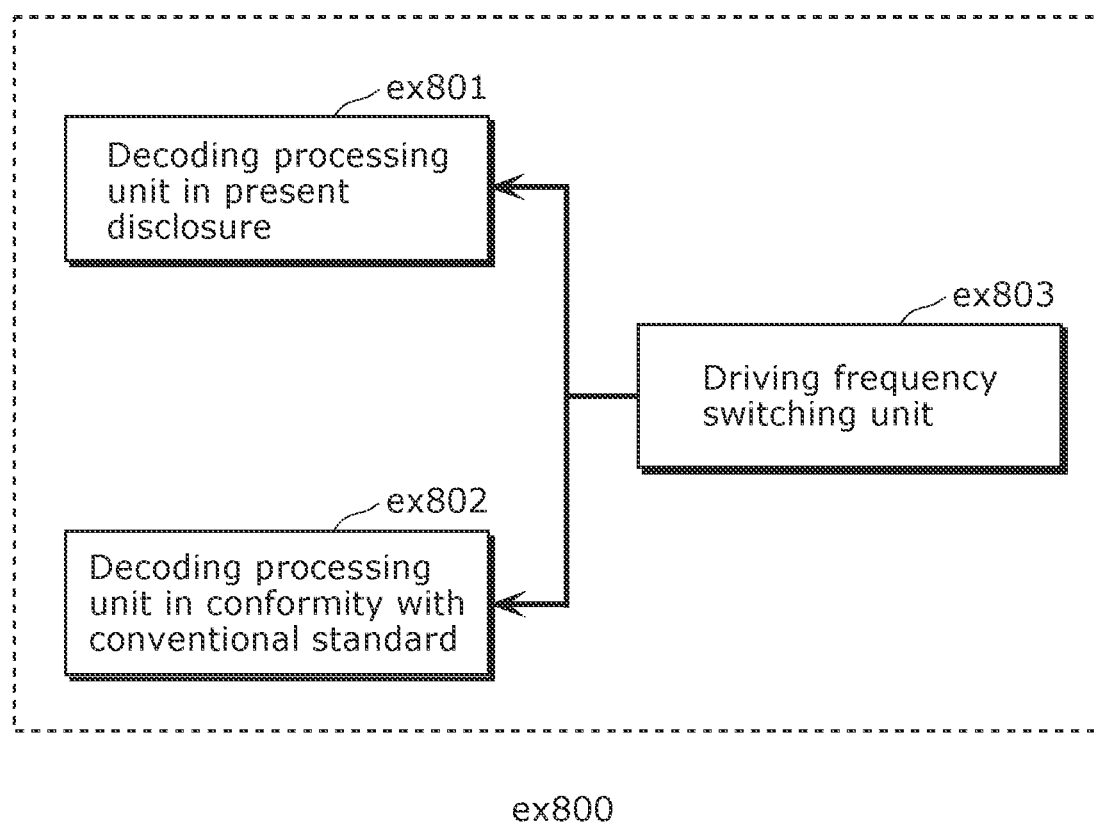
FIG. 47 is a diagram which shows a configuration for switching between driving frequencies.

In view of the above, the moving picture decoding apparatus, such as the television ex300 and the LSI ex500 is configured to determine to which standard the video data conforms, and switch between the driving frequencies according to the determined standard. FIG. 47 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 46. Here, each of the decoding processing unit ex801 that executes the moving picture decoding method described in each of embodiments and the decoding processing unit ex802 that conforms to the conventional standard corresponds to the signal processing unit ex507 in FIG. 46. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Fifth Embodiment is used for identifying the video data. The identification information is not limited to the one described in Fifth Embodiment but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 49. The driving frequency can be selected by storing the look-up table in the buffer ex508 and in an internal memory of an LSI, and with reference to the look-up table by the CPU ex502.

Figure 48:
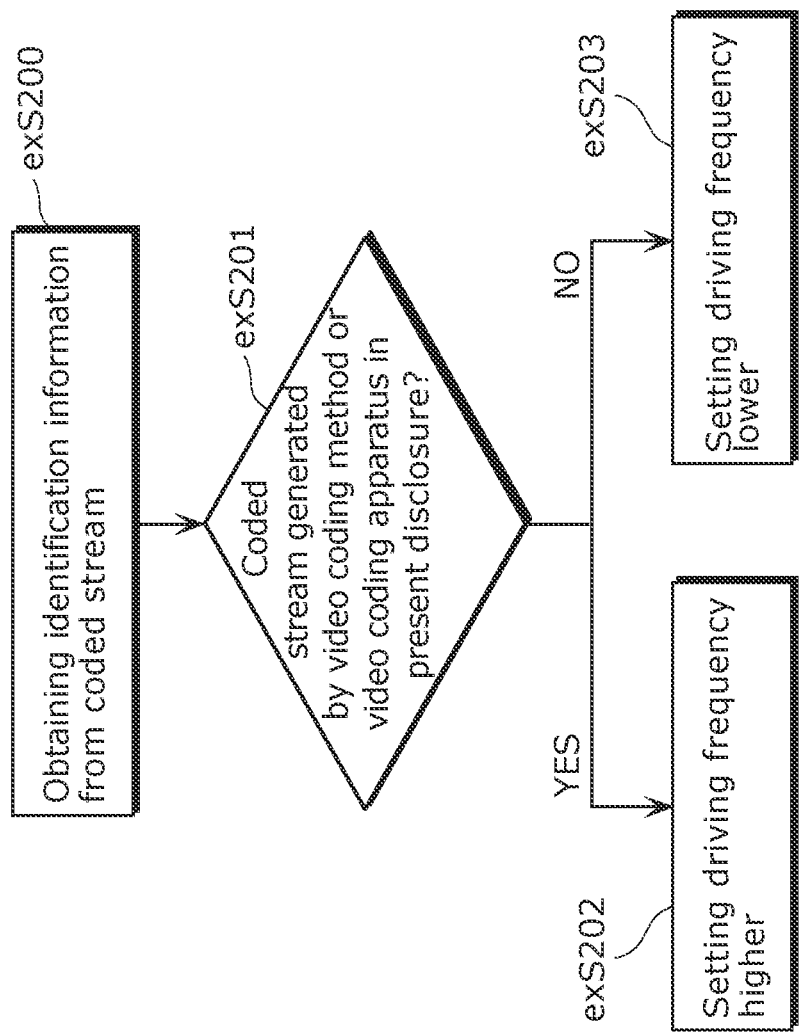
FIG. 48 is a diagram which shows steps for identifying video data and switching between driving frequencies.

FIG. 48 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Eighth Embodiment

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In view of the above, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 50A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present disclosure and does not conform to MPEG-4 AVC. In particular, since the aspect of the present disclosure is characterized by inverse quantization, it is possible, for example, for the dedicated decoding processing unit ex901 to be used for inverse quantization, and for the decoding processing unit to be shared by any or all of the other processing, such as entropy decoding, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 50B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The present disclosure is applicable to an image encoding apparatus, an image decoding apparatus, and the like.

The invention claimed is:

1. An encoding method comprising:
   judging whether or not a picture is a key picture having a temporal level that is lower than a temporal level of a current picture;
   constructing a reference picture list including a valid reference picture for the current picture; and
   encoding the current picture using the valid reference picture included in the reference picture list,
   wherein when the current picture is a first picture of a switched temporal level higher than a temporal level of the key picture, all of reference pictures included in a reference picture memory are key pictures.

2. An encoder comprising:
   processing circuitry; and
   a memory coupled to the processing circuitry,
   wherein the processing circuitry is configured to:
      judge whether or not a picture is a key picture having a temporal level that is lower than a temporal level of a current picture;
      construct a reference picture list including a valid reference picture for the current picture; and
      encode the current picture using the valid reference picture included in the reference picture list,
   wherein when the current picture is a first picture of a switched temporal level higher than a temporal level of the key picture, all of reference pictures included in a reference picture memory are key pictures.

* * * * *